US012591929B1

(12) United States Patent
Bergida et al.

(10) Patent No.: US 12,591,929 B1
(45) Date of Patent: Mar. 31, 2026

(54) ELECTRONIC IDENTIFICATION AND REPORTING OF ERRORS IN CREDIT REPORTS

(71) Applicant: Credit Versio LLC, Las Vegas, NV (US)

(72) Inventors: David Bergida, Las Vegas, NV (US); Ari Gross, Las Vegas, NV (US)

(73) Assignee: Credit Versio LLC, Las Vegas, NV (US)

( * ) Notice: Subject to any disclaimer, the term of this patent is extended or adjusted under 35 U.S.C. 154(b) by 0 days.

(21) Appl. No.: 18/765,421

(22) Filed: Jul. 8, 2024

Related U.S. Application Data

(63) Continuation of application No. 17/828,419, filed on May 31, 2022, now Pat. No. 12,033,211, which is a continuation of application No. 17/390,323, filed on Jul. 30, 2021, now Pat. No. 11,810,188.

(60) Provisional application No. 63/059,922, filed on Jul. 31, 2020.

(51) Int. Cl.
| | |
|---|---|
| *G06Q 40/03* | (2023.01) |
| *G06F 16/16* | (2019.01) |
| *G06F 16/215* | (2019.01) |
| *G06F 16/23* | (2019.01) |
| *G06F 40/40* | (2020.01) |
| *G06Q 40/12* | (2023.01) |

(52) U.S. Cl.
CPC ........... *G06Q 40/03* (2023.01); *G06F 16/164* (2019.01); *G06F 16/215* (2019.01); *G06F 16/2365* (2019.01); *G06F 40/40* (2020.01); *G06Q 40/12* (2013.12)

(58) Field of Classification Search
CPC ...... G06Q 40/03; G06Q 40/12; G06F 16/164; G06F 16/215; G06F 16/2365; G06F 40/40
USPC .......................................................... 705/30
See application file for complete search history.

(56) References Cited

U.S. PATENT DOCUMENTS

| | | | |
|---|---|---|---|
| 7,542,993 B2 * | 6/2009 | Satterfield | G06Q 40/02 707/999.102 |
| 7,818,228 B1 | 10/2010 | Coulter | |
| 8,903,741 B2 | 12/2014 | Imrey | |

(Continued)

OTHER PUBLICATIONS

"Mistakes Do Happen: A look at Errors in Consumer Credit Reports", NASP, Jun. 2004 (NASP). (Year: 2004).*

(Continued)

*Primary Examiner* — Clifford B Madamba
(74) *Attorney, Agent, or Firm* — Fleit Intellectual Property Law; Paul D. Bianco; Jon Gibbons

(57) ABSTRACT

A computer system accesses electronically stored data pertaining to a consumer's current and historical credit reports from a plurality of credit bureaus. Errors in the reports are identified by the computer system, which can then create dispute letters detailing the errors with text customized for each error. The computer processes the data to identify errors within a single report and between multiple reports, both current and historical. The errors can relate to multiple accounts on a given report duplicating the same debt with the same or differing status, and reports from different credit bureaus reporting the same debt with differing status. The status can include the debt being open or closed, and the date the status of the debt changed. The errors are presented on a display with which particular errors can be selected to be included in the report.

20 Claims, 25 Drawing Sheets

(56)  References Cited

U.S. PATENT DOCUMENTS

| | | | |
|---|---|---|---|
| 8,930,263 | B1 | 1/2015 | Mahacek et al. |
| 10,366,450 | B1 | 7/2019 | Mahacek et al. |
| 10,482,532 | B1 | 11/2019 | Kapezynski |
| 10,621,657 | B2 | 4/2020 | Kasower |
| 10,685,398 | B1 | 6/2020 | Olson et al. |
| 10,963,959 | B2 | 3/2021 | Wasser et al. |
| 11,810,188 | B1 | 11/2023 | Bergida et al. |
| 12,033,211 | B1 | 7/2024 | Bergida et al. |
| 2006/0212386 | A1 | 9/2006 | Willey |
| 2007/0112668 | A1* | 5/2007 | Celano ................... G06Q 40/03 |
| | | | 705/38 |
| 2013/0173449 | A1* | 7/2013 | Ng ........................ G06Q 50/182 |
| | | | 705/38 |
| 2019/0043125 | A1 | 2/2019 | Cropper |

OTHER PUBLICATIONS

Alison Cassady, Mistakes Do Happen—A Look at Errors in Consumer Credit Reports, NASP, Jun. 2004.

\* cited by examiner

Figure 3:
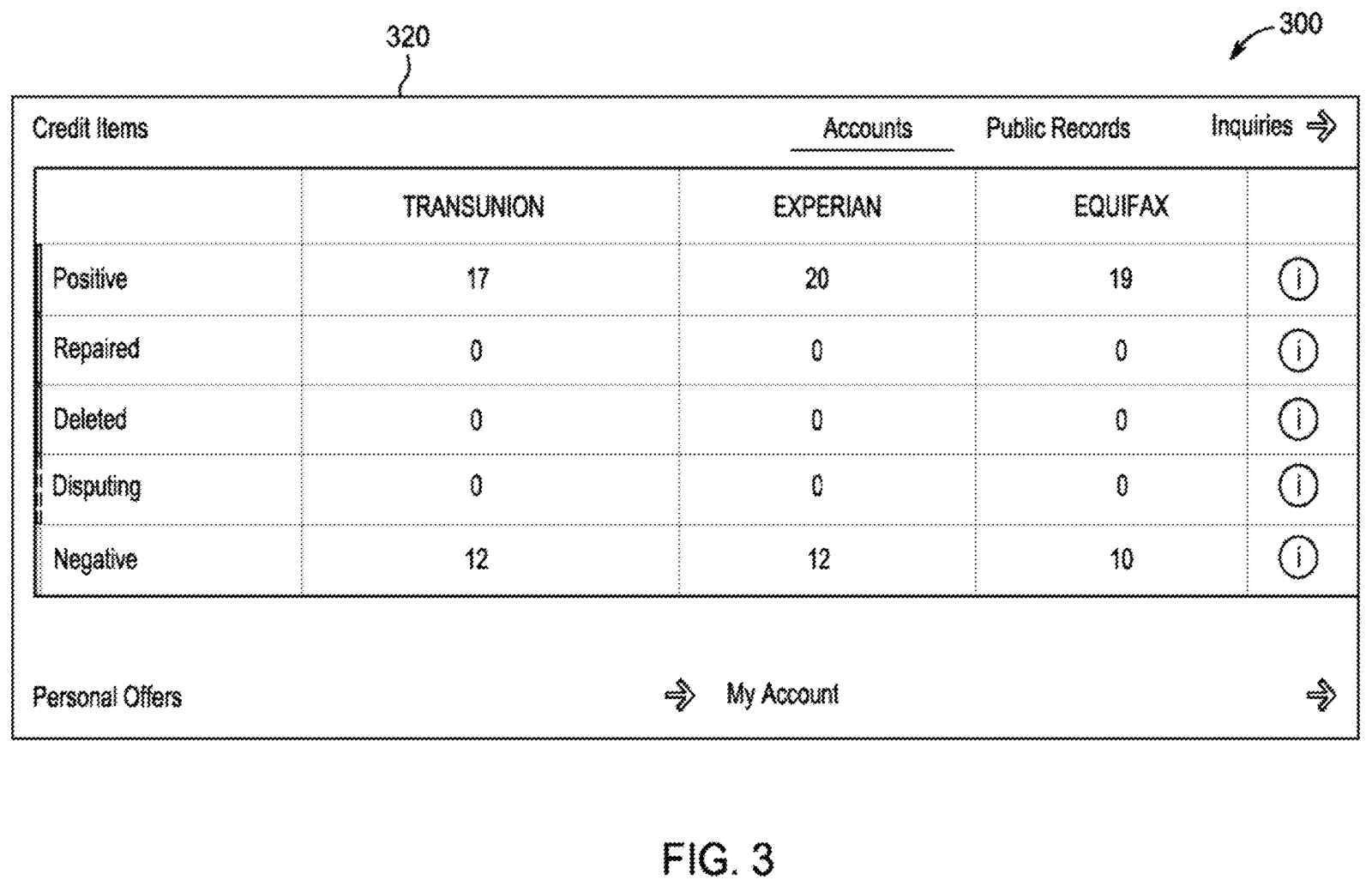

| Credit Items | TRANSUNION | EXPERIAN | EQUIFAX | Inquiries |
|---|---|---|---|---|
| Positive | 17 | 20 | 19 | – |
| Repaired | 0 | 0 | 0 | – |
| Deleted | 0 | 0 | 0 | – |
| Disputing | 0 | 0 | 0 | – |
| Negative | 12 | 12 | 10 | – |

Accounts    Public Records

My Account

Personal Offers

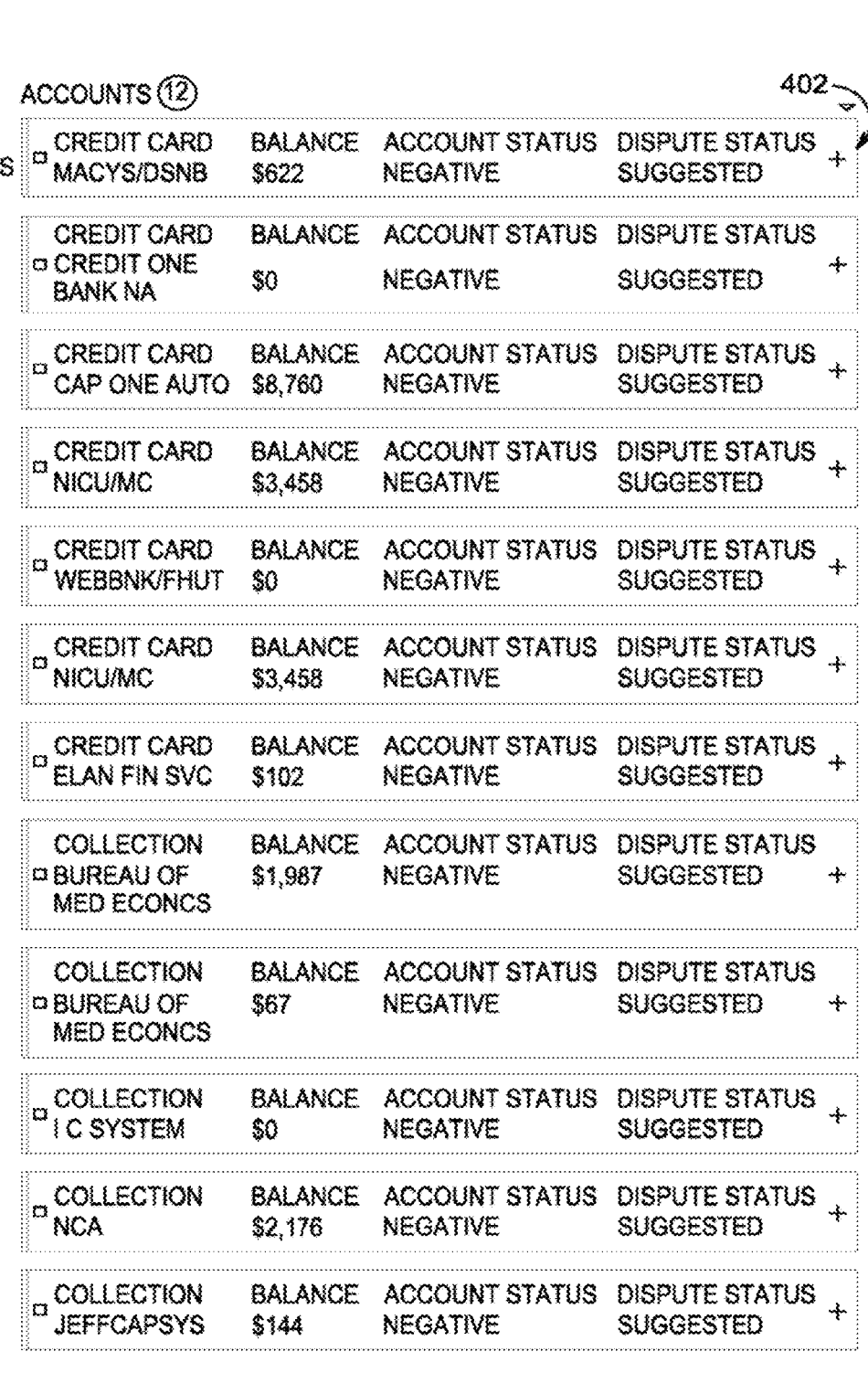

ACCOUNTS ⑫

| CREDIT CARD MACYS/DSNB | BALANCE $622 | ACCOUNT STATUS NEGATIVE | DISPUTE STATUS SUGGESTED | + |
| CREDIT CARD CREDIT ONE BANK NA | BALANCE $0 | ACCOUNT STATUS NEGATIVE | DISPUTE STATUS SUGGESTED | + |
| CREDIT CARD CAP ONE AUTO | BALANCE $8,760 | ACCOUNT STATUS NEGATIVE | DISPUTE STATUS SUGGESTED | + |
| CREDIT CARD NICU/MC | BALANCE $3,458 | ACCOUNT STATUS NEGATIVE | DISPUTE STATUS SUGGESTED | + |
| CREDIT CARD WEBBNK/FHUT | BALANCE $0 | ACCOUNT STATUS NEGATIVE | DISPUTE STATUS SUGGESTED | + |
| CREDIT CARD NICU/MC | BALANCE $3,458 | ACCOUNT STATUS NEGATIVE | DISPUTE STATUS SUGGESTED | + |
| CREDIT CARD ELAN FIN SVC | BALANCE $102 | ACCOUNT STATUS NEGATIVE | DISPUTE STATUS SUGGESTED | + |
| COLLECTION BUREAU OF MED ECONCS | BALANCE $1,987 | ACCOUNT STATUS NEGATIVE | DISPUTE STATUS SUGGESTED | + |
| COLLECTION BUREAU OF MED ECONCS | BALANCE $67 | ACCOUNT STATUS NEGATIVE | DISPUTE STATUS SUGGESTED | + |
| COLLECTION I C SYSTEM | BALANCE $0 | ACCOUNT STATUS NEGATIVE | DISPUTE STATUS SUGGESTED | + |
| COLLECTION NCA | BALANCE $2,176 | ACCOUNT STATUS NEGATIVE | DISPUTE STATUS SUGGESTED | + |
| COLLECTION JEFFCAPSYS | BALANCE $144 | ACCOUNT STATUS NEGATIVE | DISPUTE STATUS SUGGESTED | + |

Figure 5:
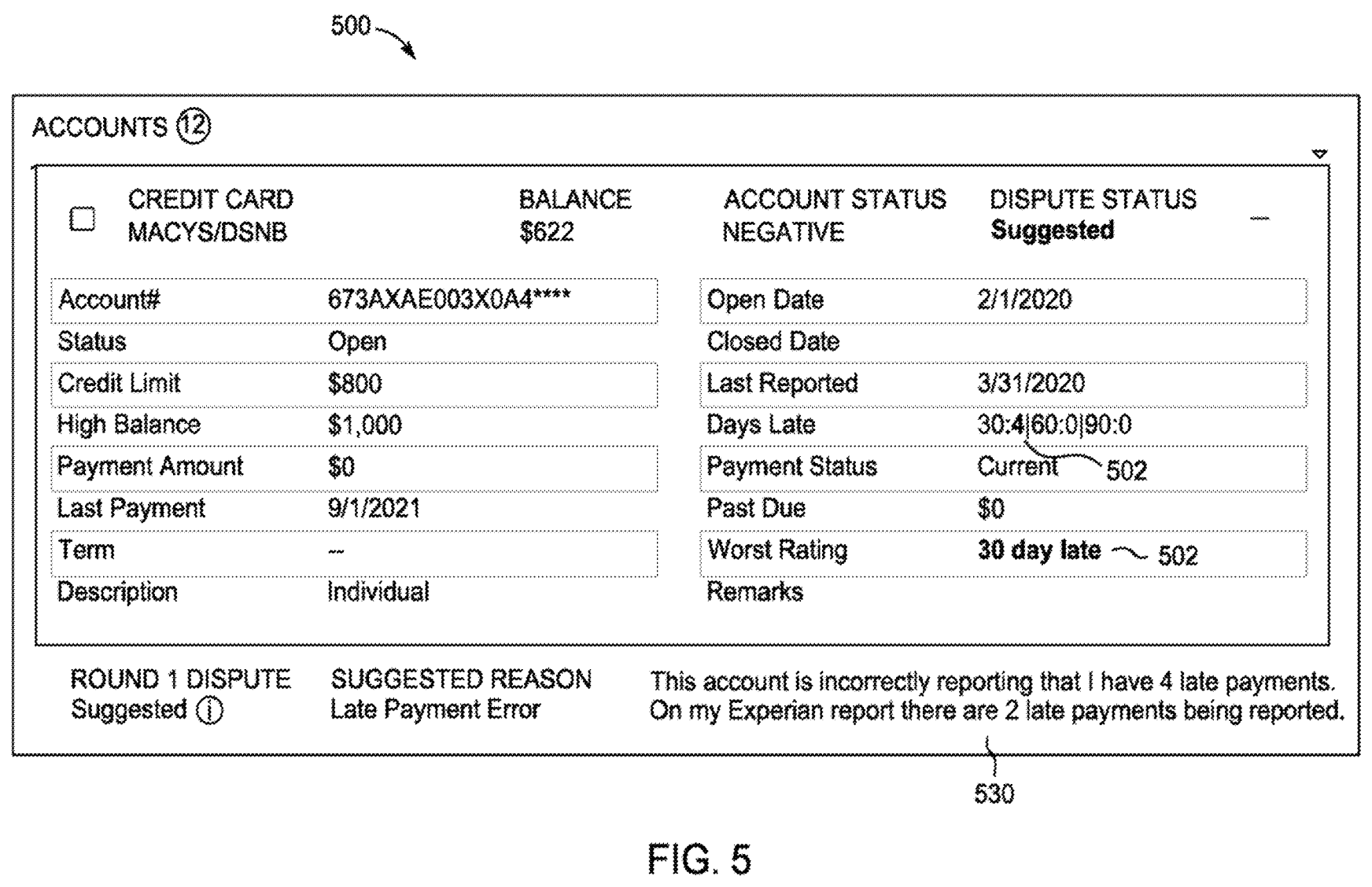

ACCOUNTS ⑫

☐ CREDIT CARD
MACYS/DSNB

BALANCE
$622

ACCOUNT STATUS
NEGATIVE

DISPUTE STATUS
Suggested

—

| | | | |
|---|---|---|---|
| Account# | 673AXAE003X0A4**** | Open Date | 2/1/2020 |
| Status | Open | Closed Date | |
| Credit Limit | $800 | Last Reported | 3/31/2020 |
| High Balance | $1,000 | Days Late | 30:4\|60:0\|90:0 |
| Payment Amount | $0 | Payment Status | Current ⁀ 502 |
| Last Payment | 9/1/2021 | Past Due | $0 |
| Term | -- | Worst Rating | 30 day late ⁀ 502 |
| Description | Individual | Remarks | |

ROUND 1 DISPUTE
Suggested ⓘ

SUGGESTED REASON
Late Payment Error

This account is incorrectly reporting that I have 4 late payments.
On my Experian report there are 2 late payments being reported.

DISPUTE STATUS

- ☐ N/A
- ☐ Suggested
- ☐ Created
- ☐ Sent
- ☐ Completed
- ☐ All

620

630

☐ CREDIT CARD NICU/MC    BALANCE $622

| | ACCOUNT STATUS NEGATIVE | DISPUTE STATUS Suggested | − |
|---|---|---|---|
| Account# | 5112 1717********* | | |
| Status | Closed | Open Date | 12/5/2016 |
| Credit Limit | $3,000 | Closed Date | 9/13/2017 |
| High Balance | $3,015 | Last Reported | 5/29/2020 |
| Payment Amount | $0 | Days Late | 30:0|60:0|90:2 |
| Last Payment | 8/11/2017 | Payment Status | Collection/Chargeoff |
| Term | | Past Due | $307 |
| Description | Individual | Worst Rating | |
| | | Remarks | Charge-off |

ROUND 1 DISPUTE    SUGGESTED REASON    This account is being reported on my credit report multiple times with same account number and open date. Please remove this error and any negative information in this account immediately.
Suggested ①    Duplicate Creditor Error

622

632

☐ CREDIT CARD WEBBNK/FHUT    BALANCE $0    | ACCOUNT STATUS NEGATIVE | DISPUTE STATUS Suggested | + |

☐ CREDIT CARD NICU/MC    BALANCE $3458

| | ACCOUNT STATUS NEGATIVE | DISPUTE STATUS Suggested | − |
|---|---|---|---|
| Account# | 5112 1717********* | | |
| Status | Closed | Open Date | 12/5/2016 |
| Credit Limit | $3,000 | Closed Date | 9/13/2017 |
| High Balance | $3,015 | Last Reported | 5/29/2020 |
| Payment Amount | $0 | Days Late | 30:0|60:0|90:2 |
| Last Payment | 8/11/2017 | Payment Status | Collection/Chargeoff |
| Term | | Past Due | $307 |
| Description | Individual | Worst Rating | |
| | | Remarks | Charge-off |

ROUND 1 DISPUTE    SUGGESTED REASON    This account is being reported on my credit report multiple times with same account number and open date. Please remove this error and any negative information in this account immediately.
Suggested ①    Duplicate Creditor Error

Figure 7:
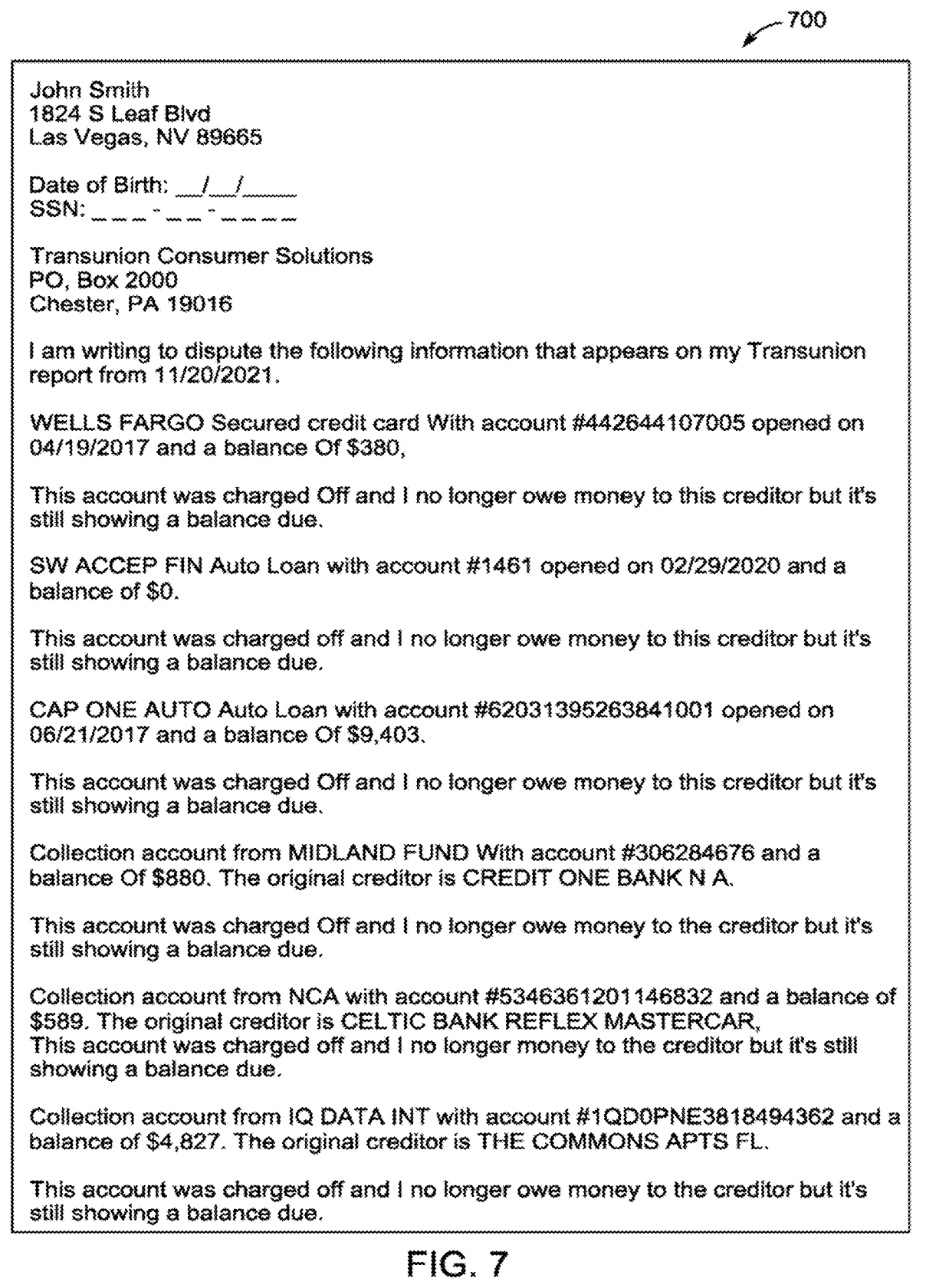

John Smith
1824 S Leaf Blvd
Las Vegas, NV 89665

Date of Birth: ___/___/_____
SSN: __ __ __ - __ __ - __ __ __ __

Transunion Consumer Solutions
PO, Box 2000
Chester, PA 19016

I am writing to dispute the following information that appears on my Transunion report from 11/20/2021.

WELLS FARGO Secured credit card With account #442644107005 opened on 04/19/2017 and a balance Of $380, This account was charged Off and I no longer owe money to this creditor but it's still showing a balance due.

SW ACCEP FIN Auto Loan with account #1461 opened on 02/29/2020 and a balance of $0.

This account was charged off and I no longer owe money to this creditor but it's still showing a balance due.

CAP ONE AUTO Auto Loan with account #62031395263841001 opened on 06/21/2017 and a balance Of $9,403.

This account was charged Off and I no longer owe money to this creditor but it's still showing a balance due.

Collection account from MIDLAND FUND With account #306284676 and a balance Of $880. The original creditor is CREDIT ONE BANK N A.

This account was charged Off and I no longer owe money to the creditor but it's still showing a balance due.

Collection account from NCA with account #5346361201146832 and a balance of $589. The original creditor is CELTIC BANK REFLEX MASTERCAR,
This account was charged off and I no longer money to the creditor but it's still showing a balance due.

Collection account from IQ DATA INT with account #1QD0PNE3818494362 and a balance of $4,827. The original creditor is THE COMMONS APTS FL.

This account was charged off and I no longer owe money to the creditor but it's still showing a balance due.

| | | |
|---|---|---|
| #4 | 3.Resold Collection | This debt was previously being reported by TRP Collections. |
| #3 | 2.Bankruptcy Error | The account was opened prior to my Chapter 7 Bankruptcy |
| #1 | 1.Debt Contract Request | I never had a contract with the debt collector for any debt. PI |
| #2 | 4.Balance Due Error | The account is incorrectly reporting that I still owe a balance |
| #5 | 5.Authorised User Error | The account is incorrectly reporting negative payment history |

FIG. 8

| Credit Items | Accounts | Public Records | Inquiries |
| --- | --- | --- | --- |
| | TRANSUNION | EXPERIAN | EQUIFAX |
| Positive | 17 | 20 | 19 |
| Repaired | 2 | 2 | 1 |
| Deleted | 4 | 3 | 3 |
| Disputing | 0 | 0 | 0 |
| Negative | 6 | 7 | 6 |

1106 ～ ANALYZING

1100 ～

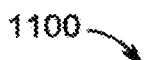

Change Strategy

1st Dispute    2nd Dispute 1102      1104

Verizon

| | TransUnion | Experian | EQUIFAX |
|---|---|---|---|
| Account#: | 51780598**** | 51780598**** | ~ |
| High Balance: | $1,905 | $1,905 | ~ |
| Last Verified: | 10/21/2021 | 10/21/2021 | ~ |
| Date of Last Activity: | 08/24/2019 | 08/24/2019 | ~ |
| Date Reported: | 10/21/2021 | 10/21/2021 | ~ |
| Date Opened: | 03/31/2004 | 03/01/2004 | ~ |
| Balance Owed: | $1,385 | $1,385 | ~ |
| Closed Date: | 2019-08-24 | 2019-08-24 | ~ |
| Account Rating: | Derogatory | Derogatory | ~ |
| Account Description: | Individual | Individual | ~ |
| Dispute Status: | Account not Disputed | Account not Disputed | ~ |
| Creditor Type: | Utilities & Fuel | Wireless Telephone | ~ |
| Account Status: | Closed | Closed | ~ |
| Payment Status: | Collection/Chargeoff | Collection/Chargeoff | ~ |
| Creditor Remarks: | Collection Amount Placed for Collection | Account Closed at consumer's request | ~ |
| Payment Amount: | $0 | $0 | ~ |
| Last Payment: | ~ | 08/29/2019 | ~ |
| Term Length: | ~ | 1 Month(s) | ~ |
| Past Due Amount: | $1,905 | $1,905 | ~ |
| Account Type: | Cellular or Review | Collection | ~ |
| Payment Frequency: | ~ | ~ | ~ |
| Credit Limit: | ~ | ~ | ~ |

Bankruptcy Error

AD ASTRA REC

| | TransUnion | Experian | EQUIFAX |
|---|---|---|---|
| Account#: | 51780598**** | 51780598**** | 51780598**** |
| High Balance: | $3,329 | $3,329 | $3,329 |
| Last Verified: | 10/21/2021 | 10/21/2021 | 10/21/2021 |
| Date of Last Activity: | 08/24/2019 | 08/24/2019 | 08/24/2019 |
| Date Reported: | 10/21/2021 | 10/21/2021 | 10/21/2021 |
| Date Opened: | 05/18/2016 | 05/18/2016 | 05/18/2016 |
| Balance Owed: | $3,170 | $0 | $3,170 |
| Closed Date: | ~ | 2019-08-24 | 2019-08-24 |
| Account Rating: | Derogatory | Derogatory | Derogatory |
| Account Description: | Individual | Individual | Individual |
| Dispute Status: | Account not Disputed | Account not Disputed | Account not Disputed |
| Creditor Type: | Collection Services | Collection Agencies | Collection Agencies |
| Account Status: | Open | Closed | Closed |
| Payment Status: | Collection/Chargeoff | Unknown | Collection/Chargeoff |
| Creditor Remarks: | Account information disputed | Bankruptcy Chapter 7, 11 or 12 | Account closed at consumer's request |
| Payment Amount: | $0 | $0 | $0 |
| Last Payment: | 08/29/2019 | 08/29/2019 | 08/29/2019 |
| Term Length: | ~ | ~ | ~ |
| Past Due Amount: | ~ | $0 | ~ |
| Account Type: | ~ | ~ | ~ |
| Payment Frequency: | ~ | ~ | ~ |
| Credit Limit: | ~ | ~ | ~ |

Collection Balance Error

ASSETCARE

| | TransUnion | experian | EQUIFAX |
|---|---|---|---|
| Account#: | 51780598**** | 51780598**** | ~ |
| High Balance: | $1,401 | $1,401 | ~ |
| Last Verified: | 10/21/2021 | 10/21/2021 | ~ |
| Date of Last Activity: | 08/24/2019 | 08/24/2019 | ~ |
| Date Reported: | 10/21/2021 | 10/21/2021 | ~ |
| Date Opened: | 03/31/2004 | 06/01/2021 | ~ |
| Balance Owed: | $1,401 | $1,401 | ~ |
| Closed Date: | ~ | 2019-08-24 | ~ |
| Account Rating: | Derogatory | Derogatory | ~ |
| Account Description: | Individual | Individual | ~ |

FIG. 11

1300 processing.disputedesk.com/Process/Amount/Tradelines/Summary/236937　　🖶 🖳 🖂 🖨 ⚙ Update

Figure 13:
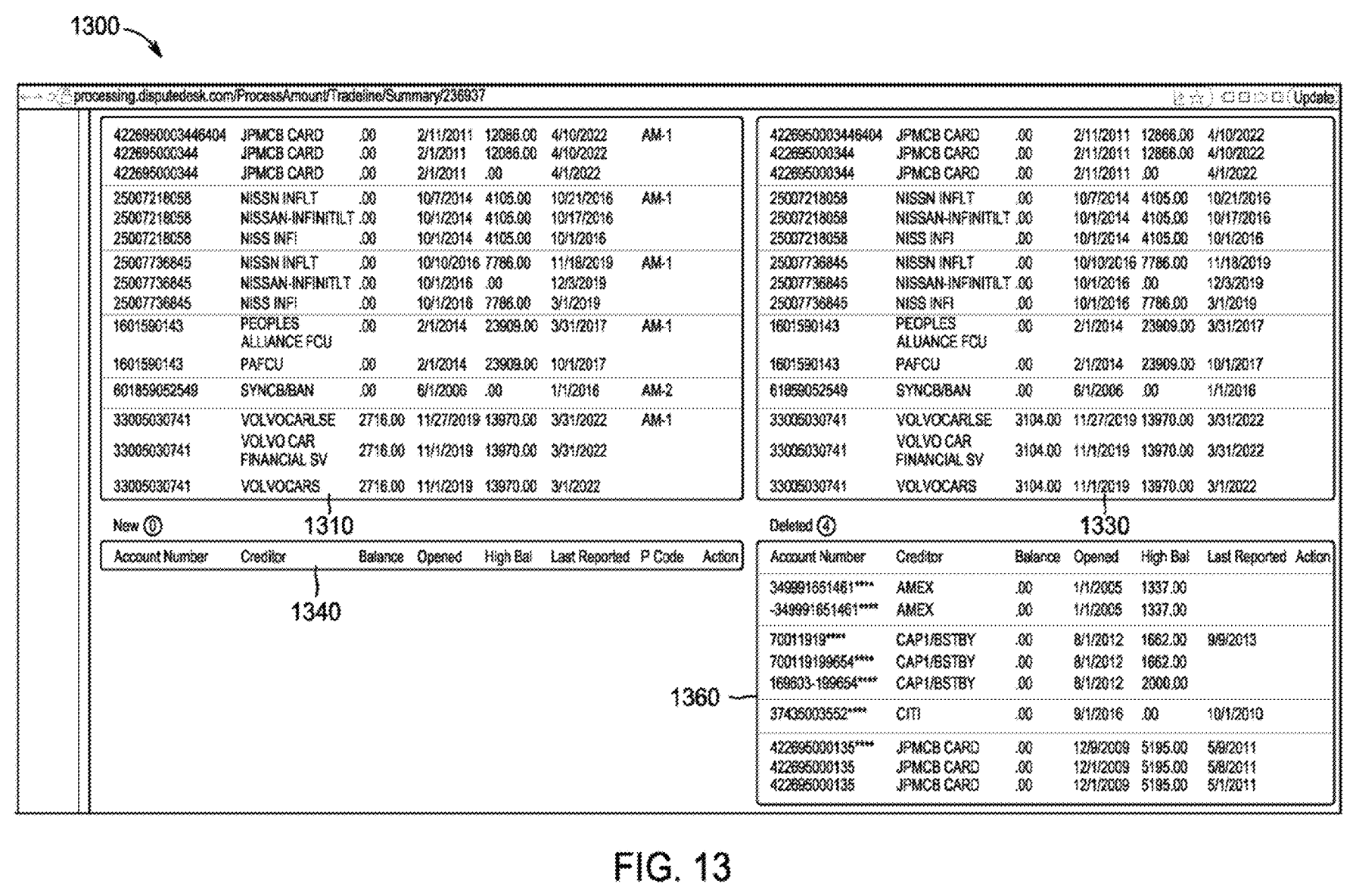

1310

1340

| Account Number | Creditor | Balance | Opened | High Bal | Last Reported | P Code | Action |
|---|---|---|---|---|---|---|---|

1330

1360

Deleted (4)

| Account Number | Creditor | Balance | Opened | High Bal | Last Reported | Action |
|---|---|---|---|---|---|---|

New ⊕

Figure 16:
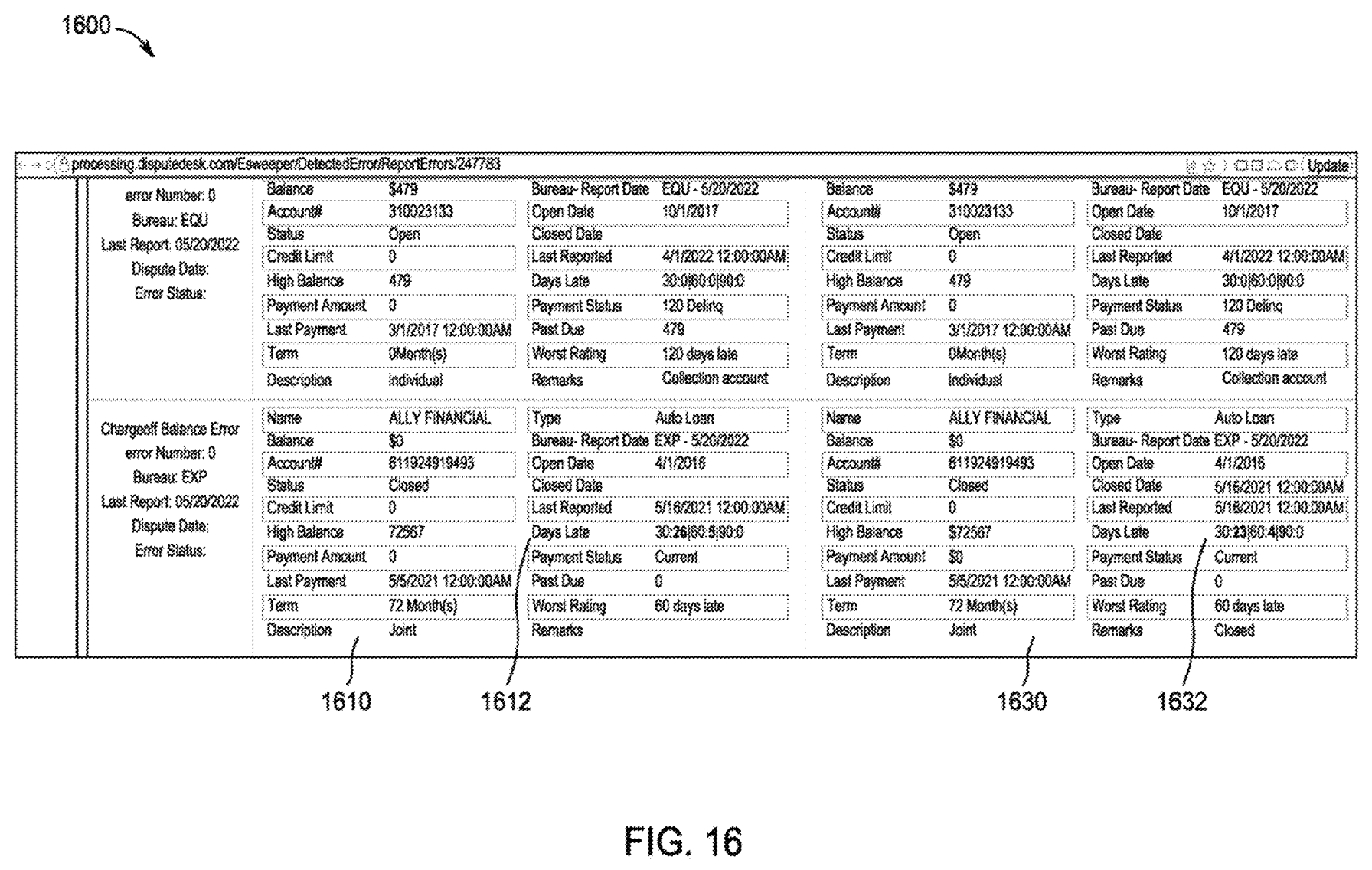

1600 processing.disputedesk.com/Esweeper/DetectedError/ReportErrors/247783　　　　　　　□○◇□□ Update error Number: 0
Bureau: EQU
Last Report: 05/20/2022
Dispute Date:
Error Status:

| | | | | |
|---|---|---|---|---|
| Balance | $479 | | Bureau- Report Date EQU - 5/20/2022 | Balance | $479 | | Bureau- Report Date EQU - 5/20/2022 |
| Account# | 310023133 | Open Date | 10/1/2017 | Account# | 310023133 | Open Date | 10/1/2017 |
| Status | Open | Closed Date | | Status | Open | Closed Date | |
| Credit Limit | 0 | Last Reported | 4/1/2022 12:00:00AM | Credit Limit | 0 | Last Reported | 4/1/2022 12:00:00AM |
| High Balance | 479 | Days Late | 30:0/60:0/90:0 | High Balance | 479 | Days Late | 30:0/60:0/90:0 |
| Payment Amount | 0 | Payment Status | 120 Delinq | Payment Amount | 0 | Payment Status | 120 Delinq |
| Last Payment | 3/1/2017 12:00:00AM | Past Due | 479 | Last Payment | 3/1/2017 12:00:00AM | Past Due | 479 |
| Term | 0Month(s) | Worst Rating | 120 days late | Term | 0Month(s) | Worst Rating | 120 days late |
| Description | Individual | Remarks | Collection account | Description | Individual | Remarks | Collection account |

1610　　　　　　　　　　1612　　　　　　　　　　1630

Chargeoff Balance Error
error Number: 0
Bureau: EXP
Last Report: 05/20/2022
Dispute Date:
Error Status:

| | | | | |
|---|---|---|---|---|
| Name | ALLY FINANCIAL | Type | Auto Loan | Name | ALLY FINANCIAL | Type | Auto Loan |
| Balance | $0 | Bureau- Report Date EXP - 5/20/2022 | Balance | $0 | Bureau- Report Date EXP - 5/20/2022 |
| Account# | 811924919493 | Open Date | 4/1/2016 | Account# | 811924919493 | Open Date | 4/1/2016 |
| Status | Closed | Closed Date | | Status | Closed | Closed Date | |
| Credit Limit | 0 | Last Reported | 5/16/2021 12:00:00AM | Credit Limit | 0 | Last Reported | 5/16/2021 12:00:00AM |
| High Balance | 72567 | Days Late | 30:26/60:5/90:0 | High Balance | $72567 | Days Late | 30:23/60:4/90:0 |
| Payment Amount | 0 | Payment Status | Current | Payment Amount | $0 | Payment Status | Current |
| Last Payment | 5/5/2021 12:00:00AM | Past Due | 0 | Last Payment | 5/5/2021 12:00:00AM | Past Due | 0 |
| Term | 72 Month(s) | Worst Rating | 60 days late | Term | 72 Month(s) | Worst Rating | 60 days late |
| Description | Joint | Remarks | | Description | Joint | Remarks | Closed |

1700 processing.disputedesk.com/Esweeeper/DetectedErrorReportErrors247791  Update

Figure 17:
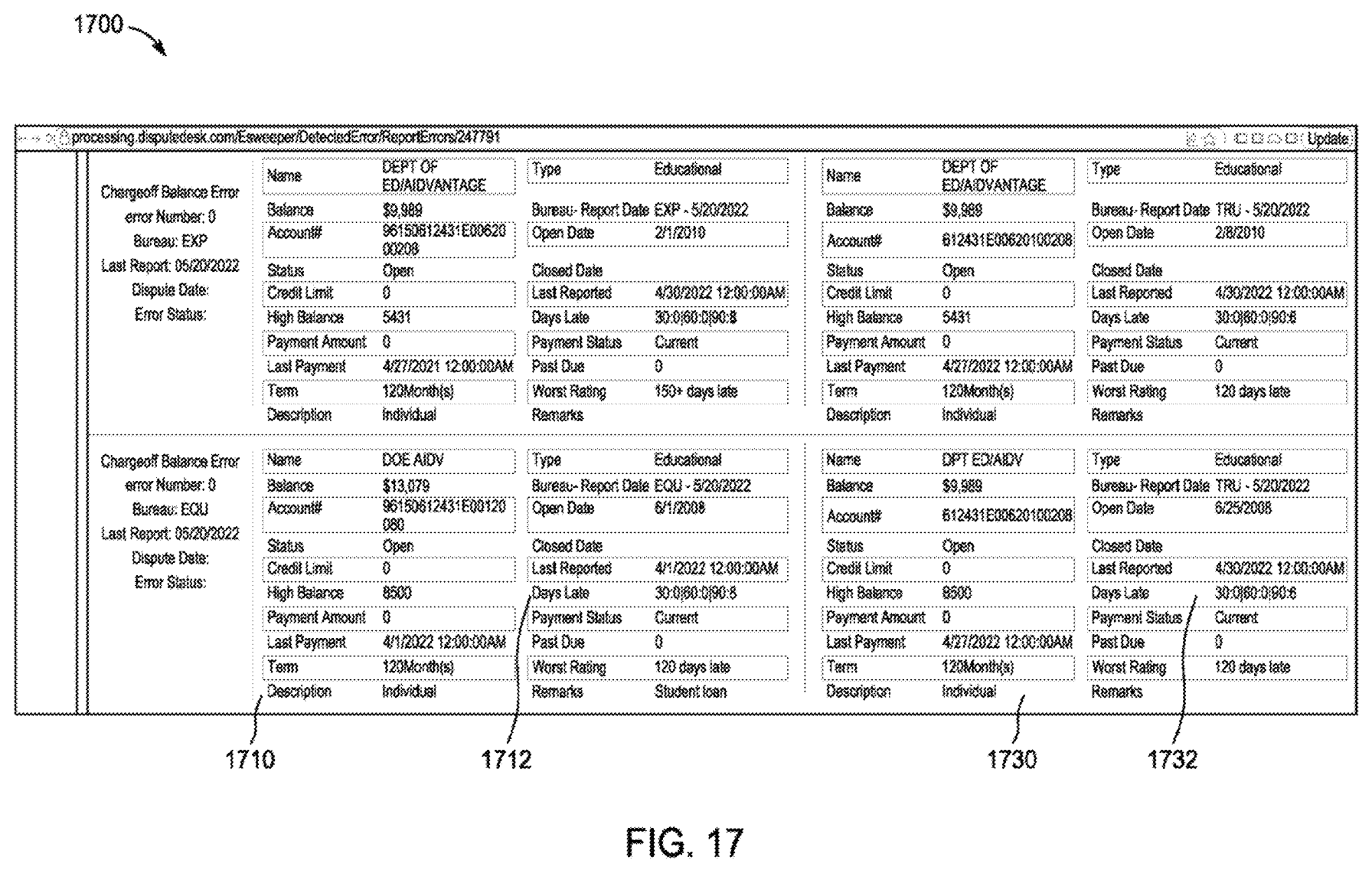

Chargeoff Balance Error
error Number: 0
Bureau: EXP
Last Report: 05/20/2022
Dispute Date:
Error Status:

| | |
|---|---|
| Name | DEPT OF ED/ADVANTAGE |
| Balance | $9,989 |
| Account# | 9615D612431E006620 00208 |
| Status | Open |
| Credit Limit | 0 |
| High Balance | 5431 |
| Payment Amount | 0 |
| Last Payment | 4/27/2021 12:00:00AM |
| Term | 120Month(s) |
| Description | Individual |

| | |
|---|---|
| Type | Educational |
| Bureau- Report Date | EXP - 5/20/2022 |
| Open Date | 2/1/2010 |
| Closed Date | |
| Last Reported | 4/30/2022 12:00:00AM |
| Days Late | 30 0 60 0 90 8 |
| Payment Status | Current |
| Past Due | 0 |
| Worst Rating | 150+ days late |
| Remarks | |

1710

| | |
|---|---|
| Name | DEPT OF ED/ADVANTAGE |
| Balance | $9,989 |
| Account# | 612431E006620100208 |
| Status | Open |
| Credit Limit | 0 |
| High Balance | 5431 |
| Payment Amount | 0 |
| Last Payment | 4/27/2022 12:00:00AM |
| Term | 120Month(s) |
| Description | Individual |

| | |
|---|---|
| Type | Educational |
| Bureau- Report Date | TRU - 5/20/2022 |
| Open Date | 2/8/2010 |
| Closed Date | |
| Last Reported | 4/30/2022 12:00:00AM |
| Days Late | 30 0 60 0 90 8 |
| Payment Status | Current |
| Past Due | 0 |
| Worst Rating | 120 days late |
| Remarks | |

Chargeoff Balance Error
error Number: 0
Bureau: EQU
Last Report: 05/20/2022
Dispute Date:
Error Status:

| | |
|---|---|
| Name | DOE ADV |
| Balance | $13,079 |
| Account# | 9615D612431E001120 080 |
| Status | Open |
| Credit Limit | 0 |
| High Balance | 8500 |
| Payment Amount | 0 |
| Last Payment | 4/1/2022 12:00:00AM |
| Term | 120Month(s) |
| Description | Individual |

| | |
|---|---|
| Type | Educational |
| Bureau- Report Date | EQU - 5/20/2022 |
| Open Date | 6/1/2008 |
| Closed Date | |
| Last Reported | 4/1/2022 12:00:00AM |
| Days Late | 30 0 60 0 90 8 |
| Payment Status | Current |
| Past Due | 0 |
| Worst Rating | 120 days late |
| Remarks | Student loan |

1712

| | |
|---|---|
| Name | DPT ED/ADV |
| Balance | $9,989 |
| Account# | 612431E006620100208 |
| Status | Open |
| Credit Limit | 0 |
| High Balance | 8500 |
| Payment Amount | 0 |
| Last Payment | 4/27/2022 12:00:00AM |
| Term | 120Month(s) |
| Description | Individual |

| | |
|---|---|
| Type | Educational |
| Bureau- Report Date | TRU - 5/20/2022 |
| Open Date | 6/25/2008 |
| Closed Date | |
| Last Reported | 4/30/2022 12:00:00AM |
| Days Late | 30 0 60 0 90 8 |
| Payment Status | Current |
| Past Due | 0 |
| Worst Rating | 120 days late |
| Remarks | |

Category 1 Error

Errors derived by identifying inherent contradictions contained within the account details of a single account on a single bureau.

Example: On a client's TRU report from 5/1/2020 there is an account that is listed "Closed" and "Charged off" with a past due amount of $50 and a balance of $300.

TRANSUNION CREDIT REPORT

625                                                                 5/1/2020

ACCOUNTS

CAPITAL ONE        #4242424242424242****

| | | | |
|---|---|---|---|
| Account Type: | Credit Card | Limit: | $5000 |
| Date Opened: | 05/06/2019 | Status: | Closed Charged Off. |
| Past Due: | $50 | Balance: | $300 |

CHASE        #4343434343434343****

| | | | |
|---|---|---|---|
| Account Type: | Credit Card | Limit: | $5000 |
| Date Opened: | 05/06/2019 | Status: | Closed Charged Off. |
| Past Due: | $300 | Balance: | $300 |

1910

Error details: as the account status is both Closed and Charged Off, the past due amount and the balance amount should be equal.

FIG. 19

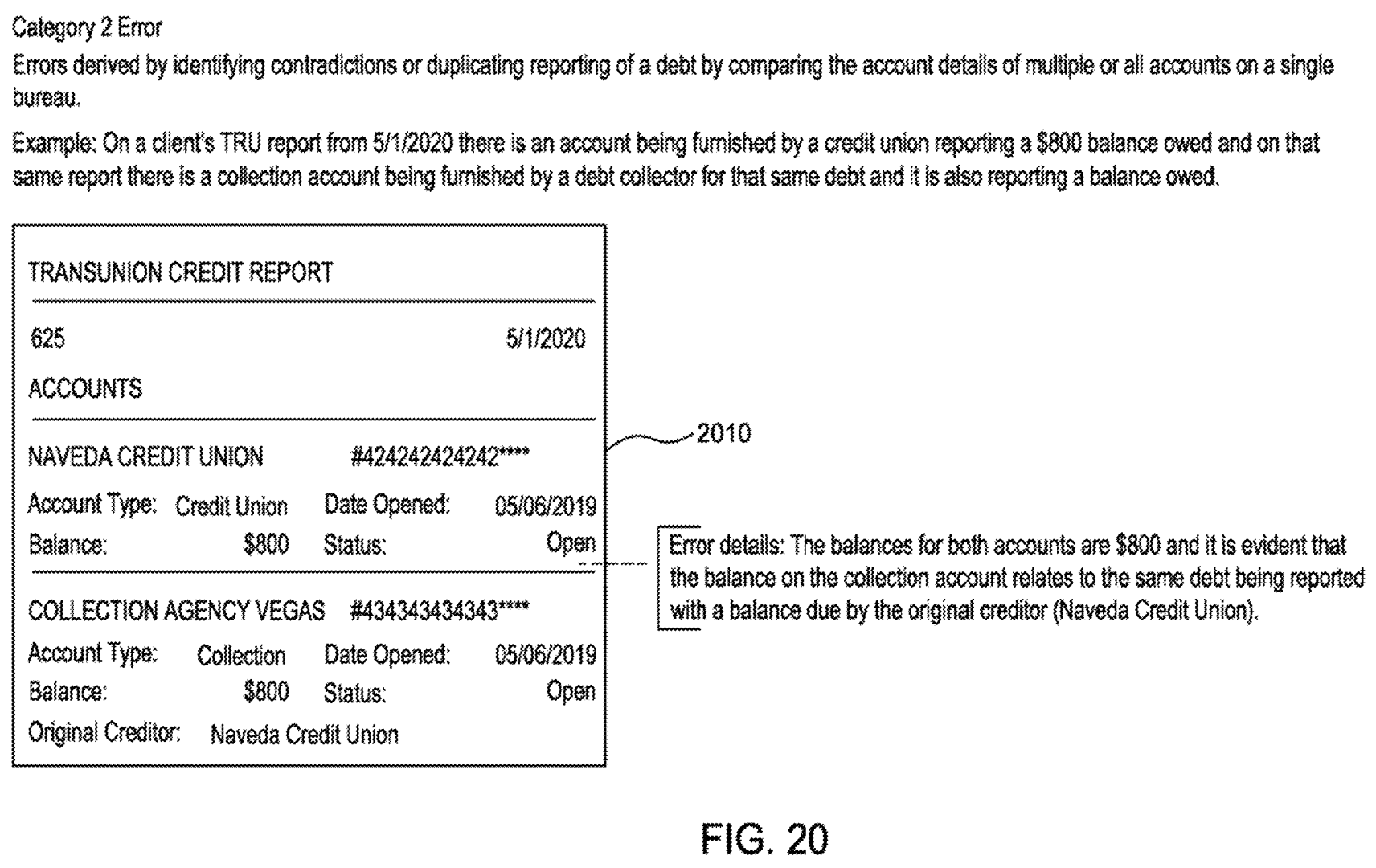

Category 2 Error

Errors derived by identifying contradictions or duplicating reporting of a debt by comparing the account details of multiple or all accounts on a single bureau.

Example: On a client's TRU report from 5/1/2020 there is an account being furnished by a credit union reporting a $800 balance owed and on that same report there is a collection account being furnished by a debt collector for that same debt and it is also reporting a balance owed.

TRANSUNION CREDIT REPORT 625                                                    5/1/2020

ACCOUNTS

NAVEDA CREDIT UNION        #42424242424242****
Account Type:  Credit Union    Date Opened:   05/06/2019
Balance:       $800            Status:        Open COLLECTION AGENCY VEGAS    #43434343434343****
Account Type:  Collection     Date Opened:   05/06/2019
Balance:       $800           Status:        Open
Original Creditor:  Naveda Credit Union

2010

Error details: The balances for both accounts are $800 and it is evident that the balance on the collection account relates to the same debt being reported with a balance due by the original creditor (Naveda Credit Union).

FIG. 20

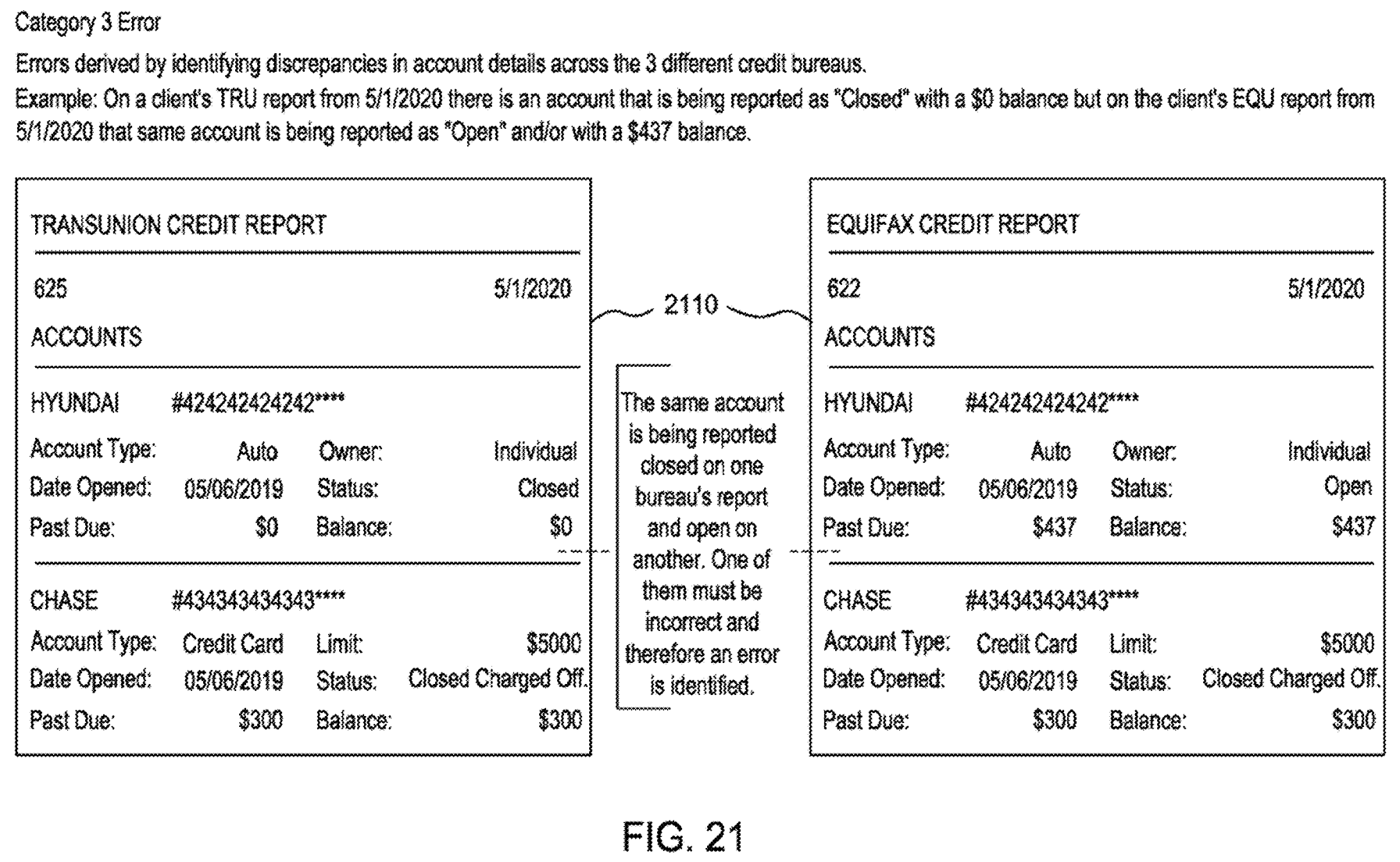

Category 3 Error

Errors derived by identifying discrepancies in account details across the 3 different credit bureaus.

Example: On a client's TRU report from 5/1/2020 there is an account that is being reported as "Closed" with a $0 balance but on the client's EQU report from 5/1/2020 that same account is being reported as "Open" and/or with a $437 balance.

TRANSUNION CREDIT REPORT

625                                                                  5/1/2020

ACCOUNTS

HYUNDAI        #42424242424242****

| Account Type: | Auto | Owner: | Individual |
|---|---|---|---|
| Date Opened: | 05/06/2019 | Status: | Closed |
| Past Due: | $0 | Balance: | $0 |

CHASE          #43434343434343****

| Account Type: | Credit Card | Limit: | $5000 |
|---|---|---|---|
| Date Opened: | 05/06/2019 | Status: | Closed Charged Off. |
| Past Due: | $300 | Balance: | $300 |

2110

The same account is being reported closed on one bureau's report and open on another. One of them must be incorrect and therefore an error is identified.

EQUIFAX CREDIT REPORT

622                                                                  5/1/2020

ACCOUNTS

HYUNDAI        #42424242424242****

| Account Type: | Auto | Owner: | Individual |
|---|---|---|---|
| Date Opened: | 05/06/2019 | Status: | Open |
| Past Due: | $437 | Balance: | $437 |

CHASE          #43434343434343****

| Account Type: | Credit Card | Limit: | $5000 |
|---|---|---|---|
| Date Opened: | 05/06/2019 | Status: | Closed Charged Off. |
| Past Due: | $300 | Balance: | $300 |

FIG. 21

Figure 22:
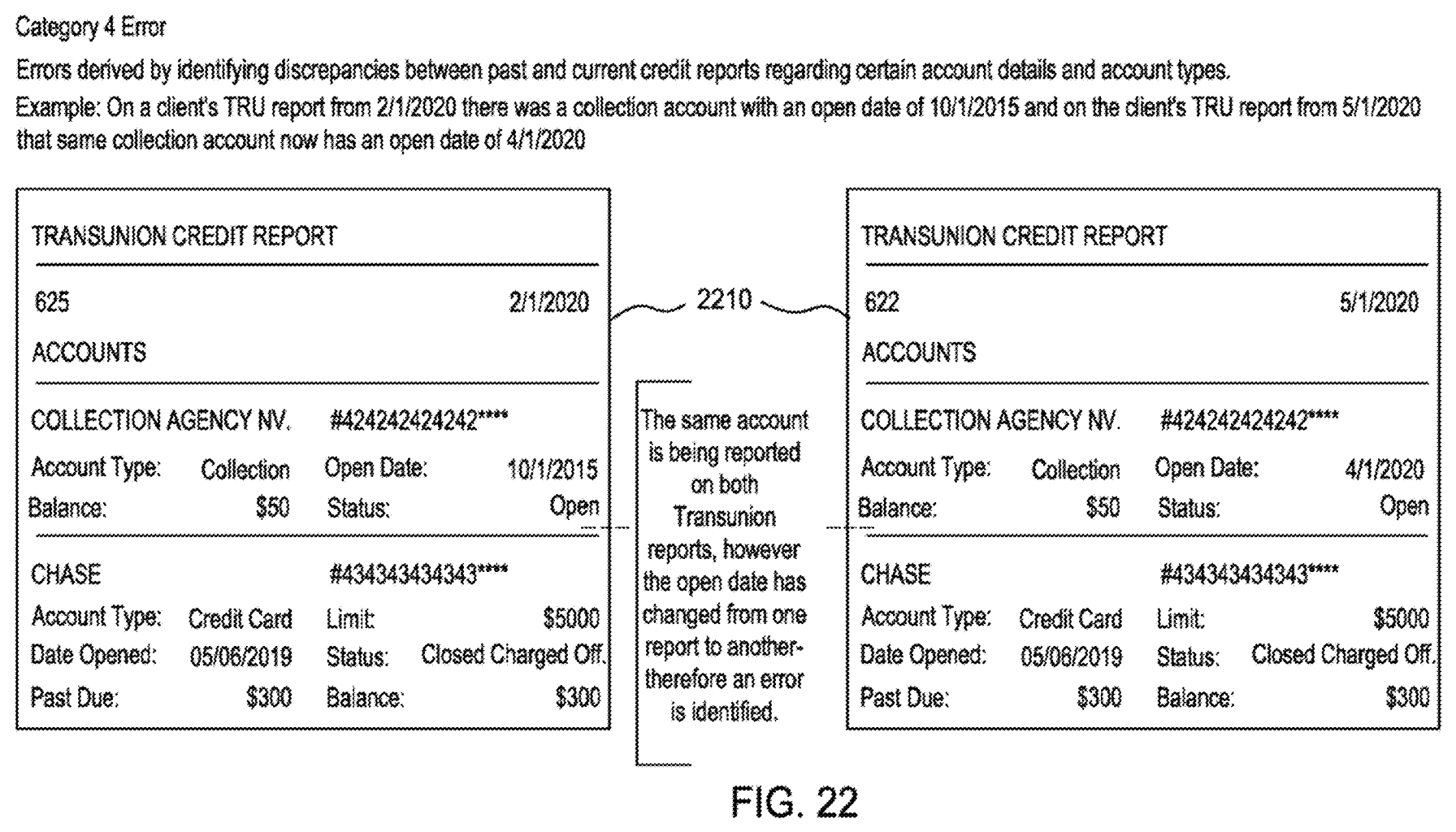

Category 4 Error

Errors derived by identifying discrepancies between past and current credit reports regarding certain account details and account types.

Example: On a client's TRU report from 2/1/2020 there was a collection account with an open date of 10/1/2015 and on the client's TRU report from 5/1/2020 that same collection account now has an open date of 4/1/2020

TRANSUNION CREDIT REPORT

625                                                                    2/1/2020

ACCOUNTS

COLLECTION AGENCY NV.          #4242424242****
Account Type:   Collection      Open Date:      10/1/2015
Balance:        $50             Status:         Open CHASE                          #4343434343****
Account Type:   Credit Card     Limit:          $5000
Date Opened:    05/06/2019      Status:         Closed Charged Off,
Past Due:       $300            Balance:        $300

2210

The same account is being reported on both Transunion reports, however the open date has changed from one report to another- therefore an error is identified.

TRANSUNION CREDIT REPORT

622                                                                    5/1/2020

ACCOUNTS

COLLECTION AGENCY NV.          #4242424242****
Account Type:   Collection      Open Date:      4/1/2020
Balance:        $50             Status:         Open CHASE                          #4343434343****
Account Type:   Credit Card     Limit:          $5000
Date Opened:    05/08/2019      Status:         Closed Charged Off,
Past Due:       $300            Balance:        $300

ELECTRONIC IDENTIFICATION AND REPORTING OF ERRORS IN CREDIT REPORTS

CROSS-REFERENCE TO RELATED APPLICATIONS

This application claims priority from and is related to U.S. application Ser. No. 17/828,419, entitled "Electronic Identification And Reporting Of Errors In Credit Reports" filed May 31, 2022, which is claims priority to and is related to U.S. application Ser. No. 17/390,323, entitled "Electronic Identification And Reporting Of Errors In Credit Reports" filed Jul. 30, 2021, which is claims priority to and is related to U.S. Provisional Application No. 63/059,922, entitled "Method And System For Automatic Error Audit And Dispute Of Credit Reports And/Or Scores", filed Jul. 31, 2020, each of these previously filed applications are hereby incorporated into the present application by reference in their entirety.

TECHNICAL FIELD

The present disclosure generally relates to credit reports and credit scores and more specifically, to a method and system of automatic audit, detection, and dispute generation for errors in credit reports and/or credit scores.

BACKGROUND

The widespread availability of financial credit has led to the ubiquitous nature of credit reports. Some individuals are obsessed with their credit score, which is a numerical value assessing the prospective borrower's credit risk based on debt payment history. Such a credit score may be used by a creditor to determine if credit should be extended to a prospective borrower and if so, the amount and terms (e.g., interest rate).

Credit reports are provided by credit bureaus or credit reporting agencies. A borrower's credit report typically includes records of prior credit transactions by the borrower, amounts borrowed, and debt payment history, which can be used to calculate the credit score. If a borrower's poor credit score is a result of incorrect negative credit report information, the borrower may be able to improve the credit score by correcting disputed items in the credit report. The dispute process may be a lengthy and tedious process in some scenarios requiring various types of documentation. To repair their credit, a borrower may be required to individually compose a letter to each credit report agency to dispute incorrect information.

Although there are professional and legal services that assist individuals in repairing credit and/or increasing a credit score, these services can be costly and may not result in an appreciable change for reasons unrelated to the individual.

Thus, there exists a need for an improved method and system of automatic audit, detection, and dispute generation for errors in credit reports and/or credit scores including for "do-it-yourself" or "self-help" credit repair.

SUMMARY OF THE DISCLOSURE

In an embodiment of the disclosure, a method for electronically detecting errors in a first credit report of an individual from a first credit agency and a second credit report of the individual from a second credit agency, comprises electronically receiving, using a computer system with a hardware computer processor, credit reports produced by the first and second credit agency; using the hardware computer processor to: identify a first category of errors in the first credit report by finding contradictions contained within each account in the first credit report; identify a first category of errors in the second credit report by finding contradictions or errors contained within each account in the second credit report; identify a second category of errors in the first credit report by finding contradictions or duplications by comparing at least two accounts in the first credit report; identify a second category of errors in the second credit report by finding contradictions or duplications by comparing at least two accounts in the second credit report; identify a third category of errors by finding discrepancies in at least one account found in both the first and second credit reports; electronically store previous versions of the first credit report and the second credit report, the previous versions electronically readable by the hardware computer processor; identify a fourth category of errors in the first credit report by finding discrepancies between the first credit report and at least one previous credit report for the individual from the first agency; and identify a fourth category of errors in the second credit report by finding discrepancies between the second credit report and at least one previous credit report for the individual from the second agency, wherein each of the identifying steps is performable by the processor without human intervention; in response to identifying at least one category of errors, present the errors to a human user together with an electronic display interface for selecting errors to include or omit; an generating a report of the included errors in a reporting format accepted by at least one of the first and second credit agency.

In variations thereof, the method includes electronically storing previous versions of the first credit report and the second credit report include uploading the first and second credit reports to an online account associated with the individual; the generated report is electronically transmittable to the at least one of the first and second credit agency; and/or the computer processor is used to electronically transmit reports to at least one of the first and second credit agency.

In another embodiment of the disclosure, a method for automatic audit, detection, and dispute generation for errors in credit reports and/or credit scores comprises: electronically storing data pertaining to a consumer's past and current credit reports from a plurality of credit bureaus; accessing the stored data over a computer network using one or more computer processors executing instructions stored on non-transitory media; processing the stored data using the one or more computer processors to identify errors (a) within a given report affecting a single account, (b) within a given report affecting multiple accounts, (c) between current reports from different credit bureaus, and (d) between current and past reports from a given credit bureau, and (e) between current and past reports from different credit bureaus; presenting a user interface controllable by the one or more processor, the interface including the identified errors, each selectable by a user of the interface to be included or not included in a report disputing the errors; and electronically preparing the report using the one or more processors, the report including the selected errors, a report prepared for each credit bureau having one or more of the errors in the report, in a format acceptable by the credit bureau.

In a variation thereof, the at least one processor can identify errors corresponding to, at least: (a) a plurality of accounts on a given report duplicating the same debt with the same status, (b) a plurality of accounts on a given report reporting the same debt with a different status, and (c) reports from different credit bureaus reporting the same debt with differing status; wherein status can include: (i) the debt being open, (ii) the debt is closed, and (iii) the date in which a status of the debt changed. Further information on the types of errors the present invention identifies is listed below in section below entitled "List of Credit Reporting Errors"

In further variations thereof, electronically preparing the report includes the at least one processor selecting textual language to include in the report corresponding to each of the particular errors identified; the at least one processor electronically communicates the electronically prepared report to one or more credit bureaus; the electronically stored data is stored in an electronic account associated with the consumer; and/or the computer processor enables at least one of electronic transmission of the report and printing of the report for sending to each of the bureaus.

In a further embodiment of the disclosure, a computer system for automatic audit, detection, and dispute generation for errors in credit reports and/or credit scores comprises one or more computer processors executing instructions stored on non-transitory media, the instructions operative to: electronically store data pertaining to a consumer's past and current credit reports from a plurality of credit bureaus; access the stored data over a computer network; process the stored data to identify errors (a) within a given report affecting a single account, (b) within a given report affecting multiple accounts, (c) between current reports from different credit bureaus, and (d) between current and past reports from a given credit bureau, and (e) between current and past reports from different credit bureaus; present a user interface controllable by the one or more processor, the interface including the identified errors, each selectable by a user of the interface to be included or not included in a report disputing the errors; and electronically prepare the report using the one or more processors, the report including the selected errors, a report prepared for each credit bureau having one or more of the errors in the report, in a format acceptable by the credit bureau.

In variations thereof, the instructions are further operative to electronically transmit the report, and/or the instructions are further operative to electronically transmit reports to at least one of the credit bureaus.

BRIEF DESCRIPTION OF THE DRAWINGS

A more complete understanding of the present disclosure and the attendant advantages and features thereof, will be more readily understood by reference to the following description when considered in conjunction with the accompanying drawings wherein:

FIG. 3 is an example lower portion of a customer screen of FIG. 2 illustrating a dashboard with the status of credit items from the three credit reporting agencies, according to one aspect of the present invention;

FIG. 4 is an example portion of a customer screen illustrating creditor accounts, according to one aspect of the present invention;

FIG. 5 is an example portion of a customer screen illustrating a selected creditor account from FIG. 4, according to one aspect of the present invention;

FIG. 6 is an example portion of a customer screen illustrating a selected creditor account from FIG. 4, according to one aspect of the present invention;

FIG. 7 is an example of a generated customized dispute letter by the system, in which the customized dispute letter is generated based on one of the credit reporting errors and with customized language and format tailored to a specific credit reporting agency, according to one aspect of the present invention;

FIG. 8 is an example list of dynamically ranking credit reporting errors found by the system, according to one aspect of the present invention;

FIG. 11 is an illustration of rounds of successive customized dispute letters being generated by the system, in which each subsequent customized dispute letter is tailored to a related response received from a credit reporting agency, according to one aspect of the present invention;

FIG. 13 is another example portion of a system administrator's screen of FIG. 12, including deleted credit information on the bottom right-side, according to one aspect of the present invention;

FIG. 15 is an example portion of a system administrator's screen illustrating a first type of a credit reporting error automatically detected by the system, according to one aspect of the present invention;

FIG. 16 is an example portion of a system administrator's screen illustrating a second type of a credit reporting error automatically detected by the system, according to one aspect of the present invention;

FIG. 17 is an example portion of a system administrator's screen illustrating a third type of a credit reporting error automatically detected by the system but is ignored since it does not affect the credit rating of the user, according to one aspect of the present invention;

FIG. 19 through FIG. 22 illustrates a select examples of credit reporting errors from the section below entitled "List of Credit Reporting Errors", according to one aspect of the present invention.

5

Figure 24:
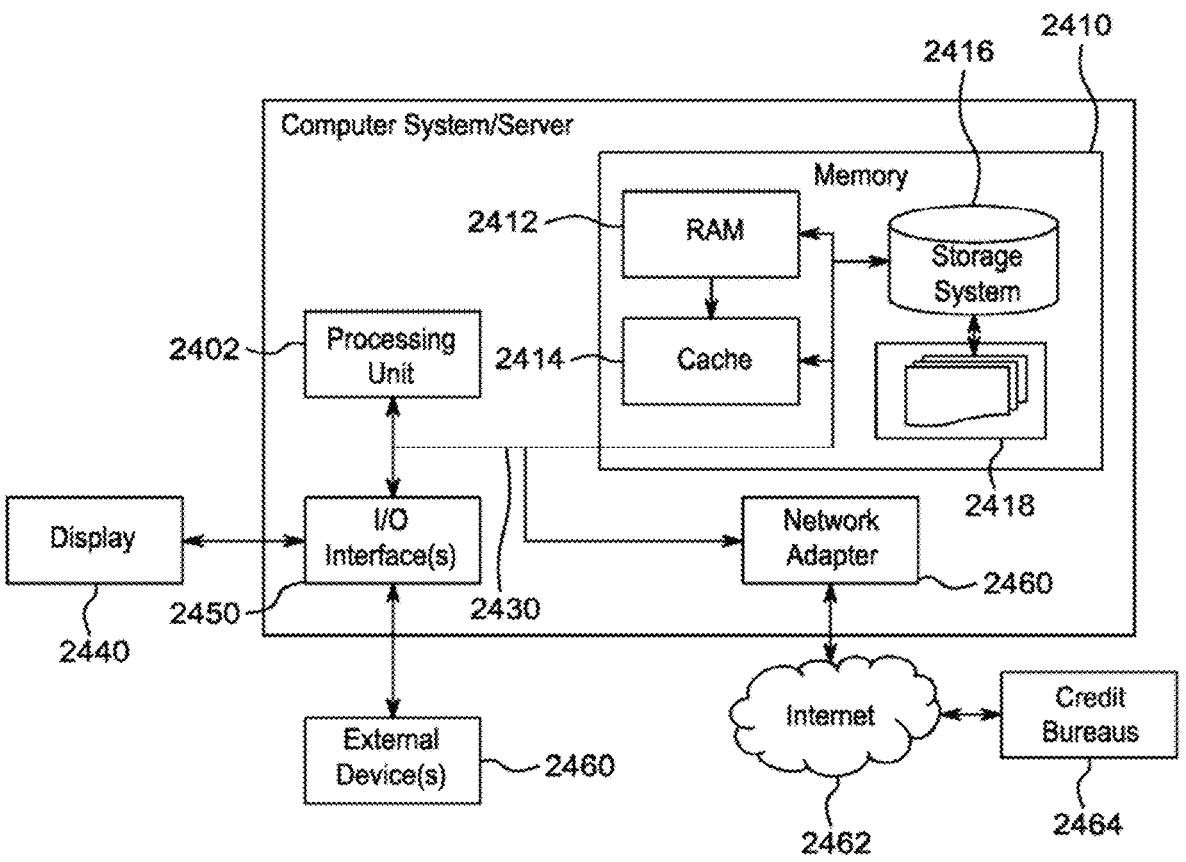

FIG. 24 is an example block diagram of the error auditing and dispute system that can be utilized in embodiments of the present disclosure.

DETAILED DESCRIPTION OF THE DISCLOSURE

As required, embodiments are disclosed herein; however, it is to be understood that the disclosed embodiments are merely examples and that the methods described below can be embodied in various forms. Therefore, specific structure and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

Non-Limiting Definitions

The terms "a", "an" and "the" are intended to include the plural forms as well unless the context clearly indicates otherwise.

The term "about" or "approximately" applies to all numeric values, whether or not explicitly indicated. These terms generally refer to a range of numbers that one of skill in the art would consider equivalent to the recited values (i.e., having the same function or result). In many instances, these terms may include numbers that are rounded to the nearest significant figure.

The term "adapted to" describes the hardware, software, or a combination of hardware and software that is capable of, able to accommodate, to make, or that is suitable to carry out a given function.

The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

The phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The term "communicate," as well as derivatives thereof, encompasses both direct and indirect communication.

The terms "comprises" and/or "comprising", when used in this specification, specify the presence of stated features, steps, operations, elements, and/or components but do not preclude the presence or addition of one or more other features, integers, steps, operations, elements, components, and/or groups thereof.

The term "configured to", describes the hardware, software, or a combination of hardware and software that is adapted to, set up, arranged, built, composed, constructed, designed, or that has any combination of these characteristics to carry out a given function.

The term "coupled", is defined as "connected," although not necessarily directly and not necessarily mechanically.

The term "credit information", is information from one or more credit reports from one or more credit reporting agencies.

The term "credit report", is a report that lists a consumer's bill payment history, loans, current debt, and other financial information. Credit reports may also show where a consumer works and lives and whether the consumer has been sued, arrested, or filed for bankruptcy.

The term "creditor", is an organization that extends credit to a consumer and is listed on a credit report.

The term "credit monitoring service" is a commercial service that typically charges a consumer a fee to watch a consumer's credit reports and alert the consumer to changes to the accounts listed on the consumer's credit report.

The term "credit reporting agencies", or "credit reporting bureaus" or just "bureau" is an organization that provides credit information and provides a credit score for a consumer. Example credit reporting agencies are Equifax, Experian, and TransUnion.

The term "credit rating", is a measurement of a person or business entity's ability to repay a financial obligation based on income and past repayment histories. Usually expressed as a credit score, banks and lenders use a credit rating as one of the factors to determine whether to lend money.

The term "customer", "client", or "user", is defined as an individual using the system.

The term "current credit report", is a report that has not yet been made part of the "master credit report".

The terms "including" and "having", are defined as comprising (i.e., open language).

The term "legal service provider", is a legal professional, legal organization, or third party service provider such as a law firm that offers credit repair services.

The term "master credit report", are one or more credit reports that have been converted into a standardized credit information format.

The term "negative item" means an error the system identified on a credit report that reduces a consumer's credit score;

The term "positive item" means an error the system identified on a credit report that increases or does not change a consumer's credit score;

The phrase "progression of at least one credit reporting error" is a credit reporting error or contradiction that is i) identified between two or credit reporting agencies, or ii) identified during subsequent rounds of credit reports from the same credit reporting agency, or iii) a combination of both.

The term "standardized credit information format" is an internal format to the system to provide a uniform data structure for comparing and searching credit information for a given user. This format is further described in the section entitled "Standardized Credit Information Format and Account Matching" below.

The terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Note that not all of the activities described above in the general description or the examples are required, that a portion of a specific activity may not be required, and that one or more further activities can be performed in addition to those described. Still further, the order in which activities are listed is not necessarily the order in which they are performed.

General Overview

The Fair Credit Reporting Act (FCRA) requires credit reporting agencies to delete any erroneous or duplicative credit information from a consumer's credit report. Over 80% of credit reports have at least one account with an error that can drop credit scores. Most consumers don't even know these errors are in their credit reports.

While the credit reporting agencies will delete these errors when requested. The problem is the consumer has to find these errors. Most consumers do not know that these errors look like or how to report them to the credit reporting agencies.

In general, the disclosure relates to a system and method for automatically determining whether errors appear on a consumer's credit report. The disclosure describes a for "do-it-yourself" or "self-help" credit repair system. The system automatically generates a dispute letter containing custom-made dispute language that describes specific errors for the purpose of helping consumers easily create FCRA dispute letters to be sent to the credit bureaus. The system and method could be used, for example, by consumers, credit repair companies, attorneys, credit bureaus, and anyone else that has an interest in identifying or trying to fix inaccuracies on a consumer credit file.

All data on a consumer's past and current credit reports from all three credit bureaus are accessed through credit monitoring service or scanned and any actual and/or likely errors are identified solely based on the information contained within the reports, without any additional input from the consumer. Certain potential errors can also be flagged to allow for additional input from the consumer to confirm whether there is indeed an error or not.

The system and method can include a separate unit which automatically generates custom-made dispute language that describes these specific errors for the purpose of helping consumers. A user interface allows a consumer to generate a dispute letter easily and intuitively by quickly selecting or approving accounts identified as errors, along with automatically generated dispute language describing the specific errors to be included in their dispute letters to be sent to the credit bureaus.

High-Level Operational Flow

Figure 1A:
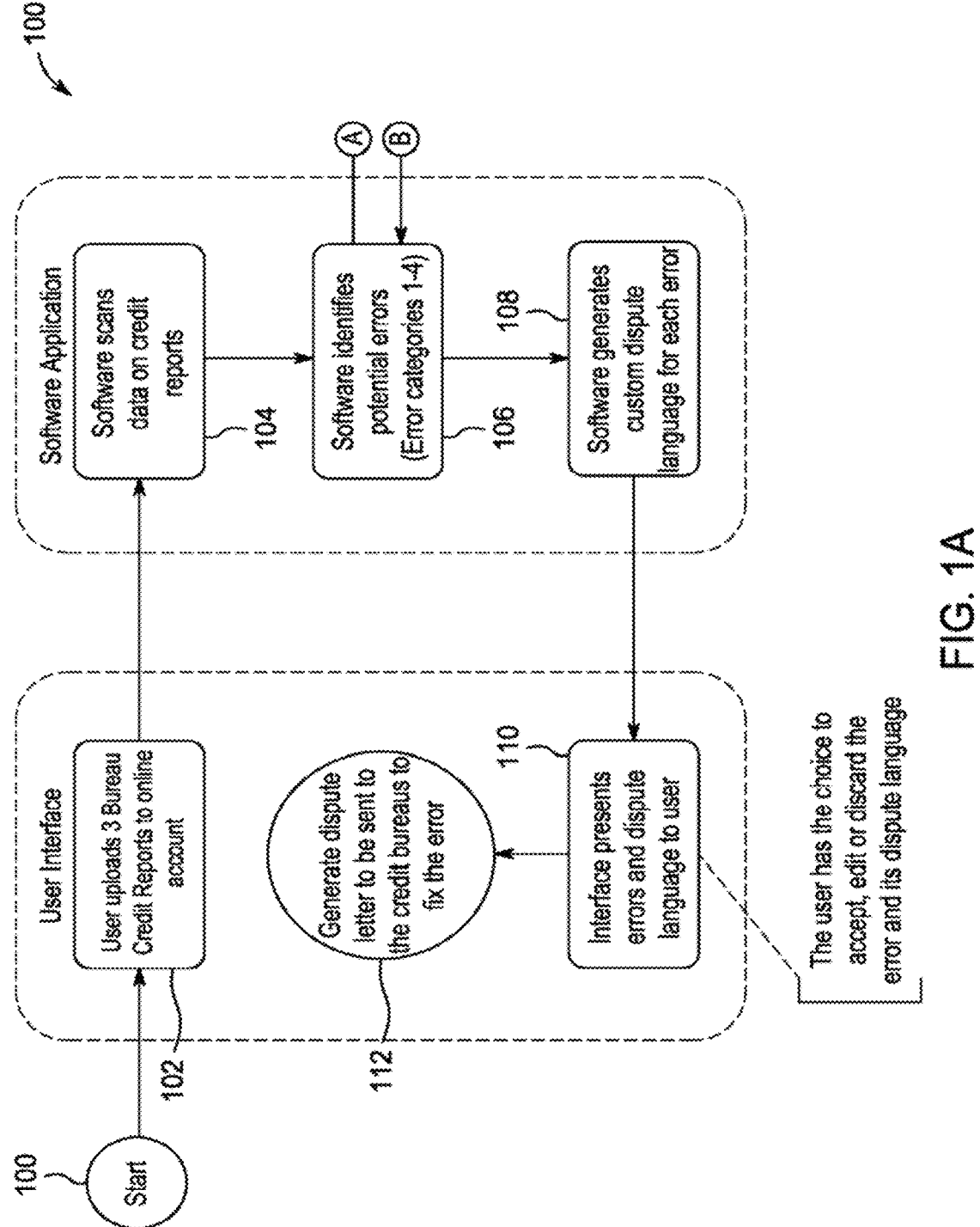
FIGS. 1A-1B is a high-level operational flow diagram illustrating one example procedure for auditing, identifying, and automatically generating dispute letters, according to one aspect of the present invention.
Figure 1B:
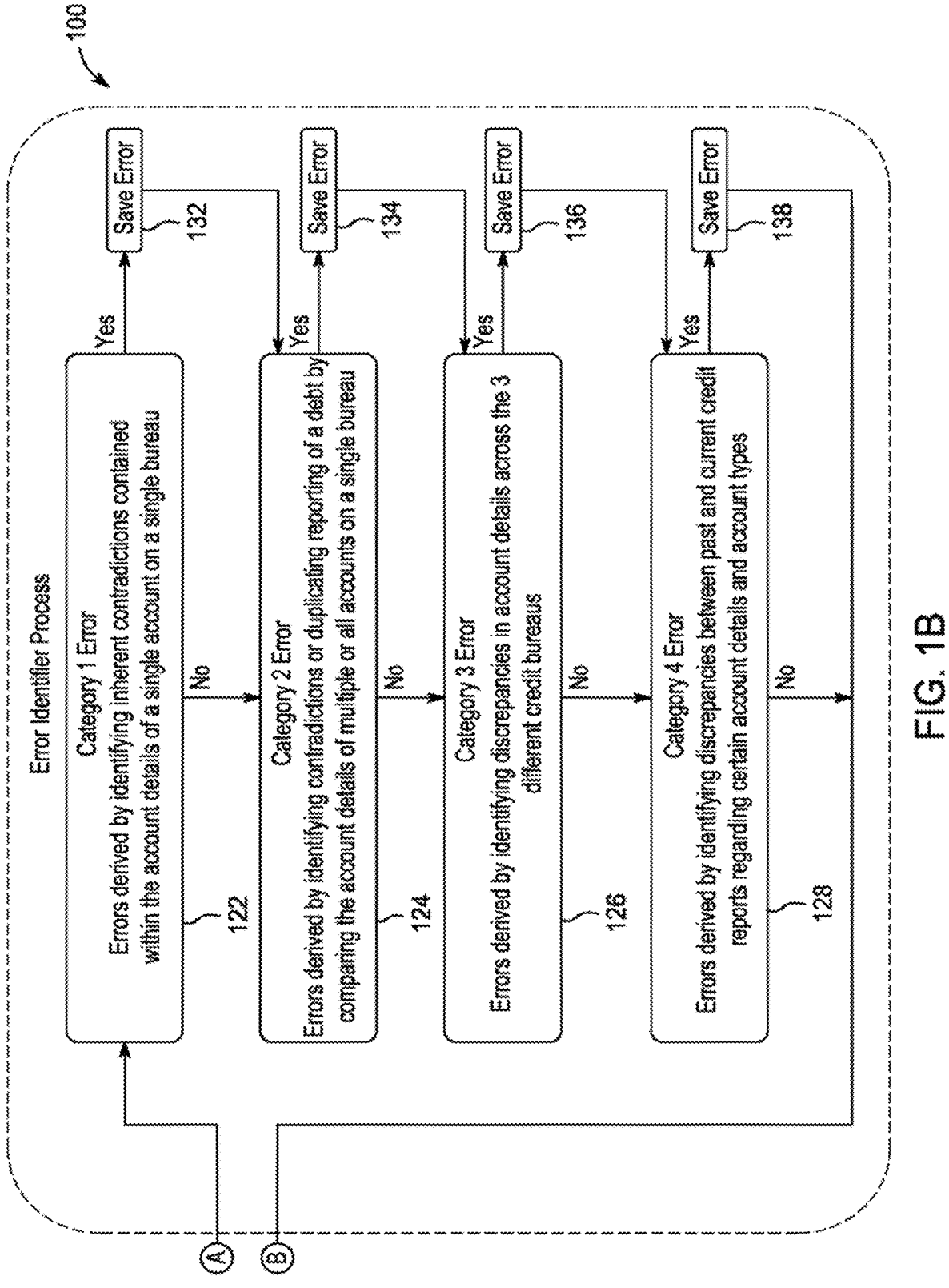

Turning now to FIGS. 1A-1B, an operational flow diagram 100 illustrating one exemplary procedure for auditing, identifying, and automatically generating dispute letters is provided. The process begins 100, 102 by uploading credit reports for the user from all three credit reporting agencies. The reports are scanned 104 and analyzed for any potential errors 106. It should be noted that although there are currently three main active credit reporting agencies, i.e., Equifax, Experian, and TransUnion, the process may be applied to different credit reporting agencies and any number of credit reporting agencies.

Shown in FIG. 1B are four example error categories 122, 124, 126, 128 as automatically detected by the system 106. The system generates custom dispute language for each error 108 and presents these errors and custom dispute language to the user 110. The user then selects to generate the custom dispute letter, print it, and mail it to the credit bureaus to repair the error. The process starts again in step

100 next time new credit information is available. It is important to note that more than four error categories are detected by the system and saved 132, 134, 136, 138. Examples of errors detected as detailed in the section below entitled "List of Credit Reporting Errors."

Standardized Credit Information Format and Account Matching

Any new item that is identified on a credit report (i.e., tradelines, collections, public records, inquiries) is formatted and stored as a master account database. Every item that exists on the first credit report from one or more crediting reporting agencies accessed for a client will all be formatted and stored as a master credit report.

Suppose one master account for a given creditor exists on more than one credit reporting agency. In that case, the unique details of the account as it appears on each unique bureau will be stored as a separate line item of history for that one master account in the master credit report.

For example, suppose the system accesses a client's first credit report dated Date_1. This first credit report includes a creditor's account, such as Amex Credit Card. This creditor's account appears on all three credit reporting agencies for Date_1. The system automatically creates a single master account record for that Amex Card. This single master account has three (3) lines of history (one for Transunion dated Date_1, one for Experian dated Date_1 and one for Equifax dated Date_1). Each line contains the unique credit information for that master account as it may appear differently on each of the three credit reporting agencies contained on the report from Date_1.

When a new credit report comes in on Date_2 from all three credit reporting agencies, every item is calculated through a series of ten or more algorithms to determine if that item can be matched with and inserted as a new line of history into an existing master account. The matching algorithm, in no particular order, examines creditor's account number, creditor's account names, including building a list of equivalent account names, opening balance, high balance, and other credit information. Otherwise, if a new item does not match any earlier reports, in which case a new master account is created for that new item. If an item on this report dated Date_2 on one or more of the credit reporting agencies is determined by the algorithms to match a previously existing matching account, then the unique details of the account as it appears on each unique bureau will be stored as a separate line item of history for that one master account. If the Amex card, which initially appeared on all three credit reporting agencies, is now on the new credit report only appears on two of the three credit reporting agencies, then that master account will have three (3) lines of history for each of the credit reporting agencies dated Date_1 and two (2) lines of history for the two credit reporting agencies it currently exists on dated Date_2.

This format of storing the information enables the system to perform each of:

a) Determining if an account changed status from previously negative to positive or vice versa. This is based on a change of data recorded on the line of history dated Date_1 to the second line of history dated Date_2 for anyone specific credit reporting agency.

b) Determining if an account was previously being reported and is now deleted from one or more credit reporting agencies. Thus, based on a specific credit reporting agency having a line of history dated Date_1 but that same credit reporting agency not having any line of history dated Date_2 even though the system accessed a credit report from that specific credit reporting agency dated Date_2.

c) Determining if there are currently any errors on one or more credit reporting agencies by comparing the data from the current lines of history (from the most recent report) to all other lines of history from either previous reports for this credit reporting agency or from lines of history on a different credit reporting agency from this current report as well as from all previous reports.

Each creditor's account in the master credit report stores credit information from credit reports by converting and storing it in a standardized credit information format. In addition, the master credit report also records and stores the information of any dispute reasons that the client may have used to dispute any credit information from any of the lines of history from any of the credit reporting agencies.

The history of the dispute language is used to calculate and determine the best-rated dispute language to use in any subsequent dispute letters that are automatically generated.

If any specific error was previously disputed with language that describes that specific error, the system will not use that language again in the future automatically generated dispute letter.

If that error that was previously disputed was not resolved and is still present on a new report, then the system automatically generates new dispute letter language that describes the details of the previous dispute and describes how the error has not been resolved, and requests a follow-up investigation.

If that error was resolved, then the system will choose the next highest-ranked error to use for the automatically generated language of the next dispute letter.

The history of the dispute language as well as the determination of whether a specific error (that was disputed with language describing that error) was resolved or deleted or is still current, is used to calculate and determine if this client can be matched and shared with a credit repair attorney.

Customer or User Console

Figure 2:
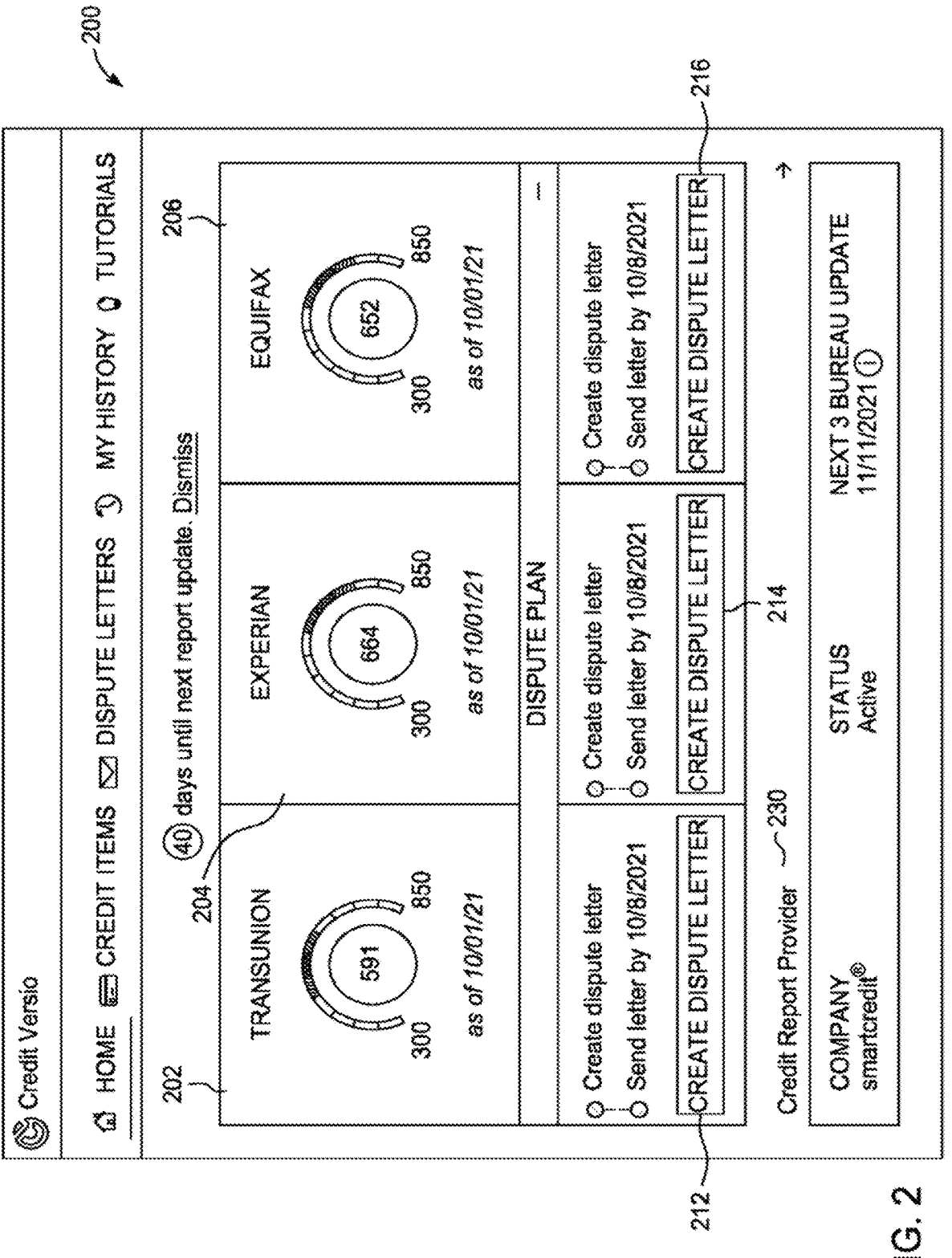
FIG. 2 is an example upper portion of a customer screen illustrating credit score and dispute letter graphical widgets, according to one aspect of the present invention.

FIG. 2 is an example upper portion 200 of a customer screen illustrating credit score and dispute letter graphical widgets as part of a dashboard, according to one aspect of the present invention. At the top shown are credit scores 202, 204, 206, from all three Equifax, Experian, and TransUnion crediting reporting agencies. This information in this example is provided by SmartCredit credit report provider 230. Other credit report providers are also available to be used by the system. Also shown is a section related to dispute plan 212, 214, 216, which is further described below.

FIG. 3 is an example lower portion 300 of a customer screen of FIG. 2 illustrating the status of credit items from the three credit reporting agencies, according to one aspect of the present invention. More specifically, shown is a table 320 with Equifax, Experian, and TransUnion with status on credit items including Positive, Repaired, Deleted, Disputing, Negative items for each Equifax, Experian, and TransUnion. It is easier to see all the positive accounts from the negative accounts. The present system may now find errors and dispute "Inquiries", "Late Payments", "Charge Offs", "Collections", "Foreclosure", "Repossessions", "Student Loans", and "Bankruptcy".

The system brings in current credit report data and converts into the standardized credit information format as described in the section above entitled "Standardized Credit Information Format and Account Matching." Next, the system compares it with previous data, also referred to as the "master credit report" from all previous credit reports. Note all this data has been previously converted into the standardized credit information format.

The system automatically analyzed every account for errors. Referring to the dispute plan suppose, in this example, the Transunion account 212 is selected. FIG. 4 is an example portion 400 of a customer screen illustrating creditor accounts, according to one aspect of the present invention. Shown is a listing of all the negative credit information listed by creditor accounts. To determine what is negative in a creditors account, the user clicks on the plus button 402 next to it. Suppose that the consumer selects the plus button 510 on the first entry for "Macys". This brings up the details shown in FIG. 5.

This brings the consumer or user to FIG. 5, which is an example portion 500 of a customer screen illustrating a selected creditor account from FIG. 4, according to one aspect of the present invention.

As shown in FIG. 5, in one example, negative information is shown in a font color 502, such as red or highlighted to make it stand out. In this example, the current report is stating four late payments and this system automatically identified is not in the master account of the master credit report) is flagged. The suggested reason is shown in 530. Note this suggested reason changes for each type of error found that negatively affect the consumer's credit rating.

FIG. 6 is an example portion 600 of a customer screen illustrating a selected creditor account with the plus "+" botton from FIG. 4, according to one aspect of the present invention. Each account 620, 622 is the dispute strategy called the suggested reason system found this charge off account reporting twice 630. It's a duplicate. The system wrote the dispute, explaining the error, and why the account should be deleted, and even includes details of both accounts in a customized letter. The system not only give the suggested reason for the dispute, but tailors the language in a format and language that the credit reporting agencies prefer in a customized letter 700 as shown in FIG. 7. This letter can be further edited by the consumer using a drop-down menu (not shown) with other suggested reasons or customizable text before the letter is generated and finalized.

The laws that give us consumers the right to dispute and remove accounts from our credit report were written in the 1970s with paper disputes in mind. Online disputes are not treated the same way as paper disputes, and that can make them far less effective. The system takes advantage of these more effective paper disputes by providing the consumer with customized letters ready to print and mail. This customized letter is simply dropped in the mail to the credit reporting agency.

The present invention is able to identify and suggest reasons for a dispute that would be difficult, if not impossible, for a human to identify based on the number of reports and formats that are being analyzed. Further, the present invention identifies all types of credit reporting errors that may negatively affect a user's credit score while ignoring errors that do not affect or have little effect on a user's credit score. The kinds of errors include exposing incorrect, unverifiable and unfair accounts. Further information on the types of errors the present invention identifies is listed below in the section below entitled "List of Credit Reporting Errors".

In the event the system identifies more than one error with credit report, it will automatically rank the error based on the potential success rate of solving the dispute and the amount the credit score may improve. Stated differently, the dispute with the highest probability of success and the provides the highest increase in the user's credit score becomes the suggested reason. This dynamic ranking 800 is shown in FIG. 8. This ranking is dynamic because the system is continuously monitoring across all user accounts the results of each dispute i.e., was it successful and by how much did it improve the credit score.

Figure 9:
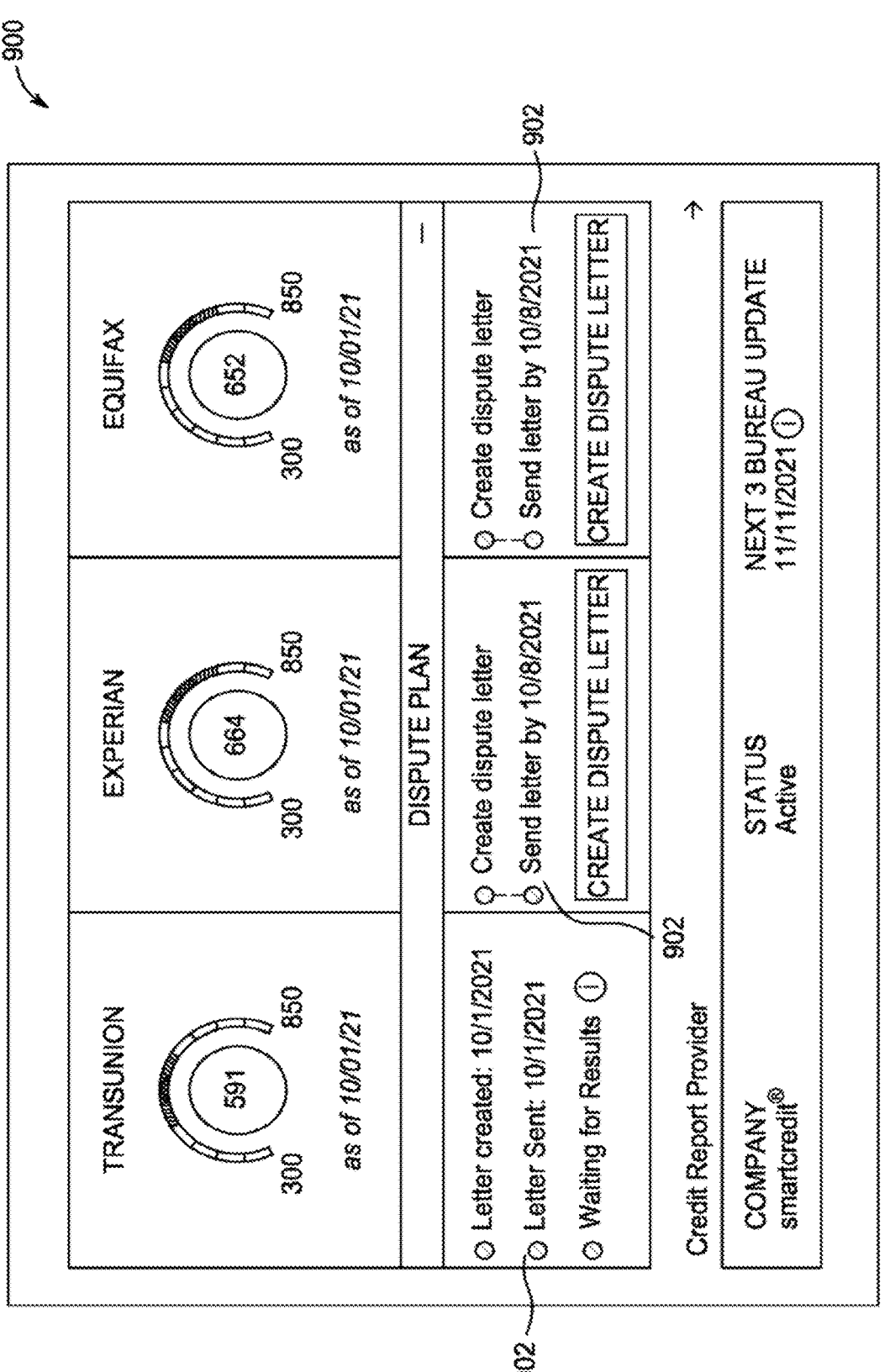
FIG. 9 is an example upper portion of a customer screen of FIG. 2 illustrating updated illustrating dispute letter graphical widgets, according to one aspect of the present invention.

FIG. 9 is an example upper portion 900 of a customer screen of FIG. 2 illustrating updated illustrating dispute letter graphical widgets 902, according to one aspect of the present invention;

To dispute an error, the consumer has to select which disputes on which credit reporting agency account to pursue. A user can pursue one dispute at time or a hundred disputes at a time. The system tracts each and every dispute individually.

Figure 10:
FIG. 10 is an example lower portion of a customer screen of FIG. 2 illustrating the updated status of credit items from the three credit reporting agencies after a dispute letter of FIG. 9 is created, sent, and processed by the credit reporting agency, according to one aspect of the present invention.

The system tracks all aspects of disputes. FIG. 10 is an example lower portion 1000 of a customer screen of FIG. 2 illustrating the updated status of credit items from the three credit reporting agencies after a dispute letter of FIG. 9 is created, sent, and processed by the credit reporting agency, according to one aspect of the present invention. As shown in FIG. 10, all disputes over time are shown that took place, including the accounts that were repaired and deleted from each bureau.

Just as importantly, FIG. 10 displays what accounts were not deleted. So, they can be disputed again. In another round of disputes, the system does not just repeat the previous language used in the previous customized dispute letter. Rather, the system uses language in the subsequent rounds of dispute that is different from the previous language used in the customized dispute letters.

FIG. 11 is an illustration 1100 of rounds $1^{st}$ dispute 1102, $2^{nd}$ dispute 1104 of successive customized dispute letters being generated by the system, in which each subsequent customized dispute letter is tailored to a related response received from a credit reporting agency 1106, according to one aspect of the present invention. The negative accounts that survived the first dispute, and are prepared to be disputed again. Using what it's learned from millions of disputes credit versions, the use of AI provides 1106 strategical dispute language by not just analyzing and learning from other users' results and strategies for the highest probability of success.

With the best of intentions, many people who try to fix their own credit or hire a credit repair company. Have limited success that's because people, even credit experts, do not have the ability to process the incredible amount of data on a credit report software has now solved that problem. Management Console As a new credit report comes in, the report is converted into a standardized credit information format for comparison to other credit reports and stored in a database according to the user's identification or ID. The conversion into the standardized credit information format is described above in the section entitled "Standardized Credit Information Format and Account Matching."

When a new report is available, all the data on the credit report has to be matched and mapped to the correct fields in the previous credit report.

There are times the matching algorithm is not able to match, within a given threshold, a specific account as part of the incoming credit report to previously-stored accounts. In this case, the system flags the report for manual review. Today, this manual matching is only a very small percentage of the reports that are processed automatically and without manual review by a human.

Figure 12:
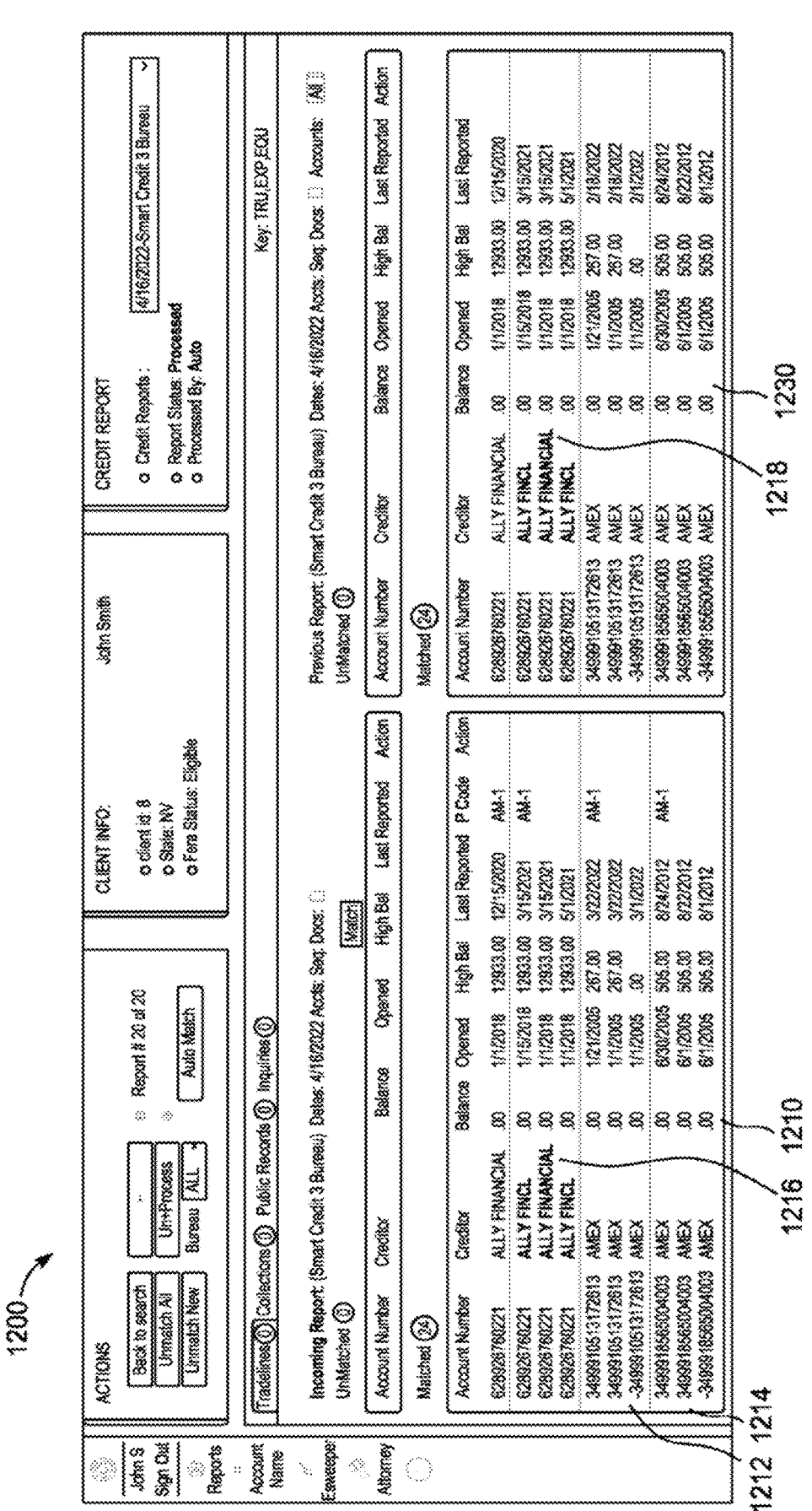
FIG. 12 is an example portion of a system administrator's screen illustrating the system matching current credit information on the left side with previously stored credit information on the right side, according to one aspect of the present invention.

FIG. 12 is an example portion 1200 of a system administrator's screen illustrating the system matching current credit information on the left side 1210 with previously stored credit information on the right side 1230, and FIG. 13 is another example portion of a system administrator's screen of FIG. 12, including deleted credit information on the bottom right-side, according to one aspect of the present invention;

New credit report data is shown on the left panel 1310, and on the right panel 1330 shown is all the previous data, also referred to as the "master account" from all previous credit reports in the master credit report. Note all this data has been previously converted into the standardized credit information format. Note there are numerous creditor accounts matched from the left panel 1310 to the right panel 1330, the credit reports that have been retrieved over time. Creditor accounts are added to the current report and automatically added as a new creditor account 1340 to the previous credit report. Likewise, creditor accounts that are not on a current credit report may be deemed to be closed or deleted 1360. These closed or deleted creditor accounts are shown as deleted creditor accounts with reference to FIG. 13.

Again, for a small number of cases, the system may flag a creditor account that it cannot match to be manually reviewed before deleting it.

In order for all this history to be lined up correctly, the system runs a series of algorithms to help match creditor accounts. The system does not rely on just account numbers. Rather it is important to note that account numbers on creditor accounts change or are truncated, or the creditor's name changes through merger or acquisition or rebranding, or the three major credit reporting agencies Equifax, Experian, and TransUnion use different formats, different spellings, and different abbreviations.

The matching process includes account numbers, account names, and open dates, and it matches creditor accounts with information that typically doesn't change from report to report. For example, the matching algorithm iterates a series of subsequent matching criteria taken in steps. The algorithm is not going to look at balance because balances are always changing, however, high balances or credit limits typically don't change, or at least don't change too often, so it will use information like that to help determine definitively to match creditor accounts. By successively matching various creditor account information, the system can quickly narrow down matching accounts from a current credit report to the previously stored credit reports.

Moreover, the present invention may use credit information from credit monitoring services, such as Smart Credit, Identity IQ, Identity Force, Credit Sesame, Complete ID, CheckIt.Credit, ID Watchdog, PrivacyGuard, and more. Each of these crediting monitoring services uses information from credit reporting agencies and provides it in different formats. Many times, the same credit monitoring services make credit information available in more than one format. This all adds to the complexity of trying to match a creditor account from a current credit report to the previous stored credit reports.

Figure 14:
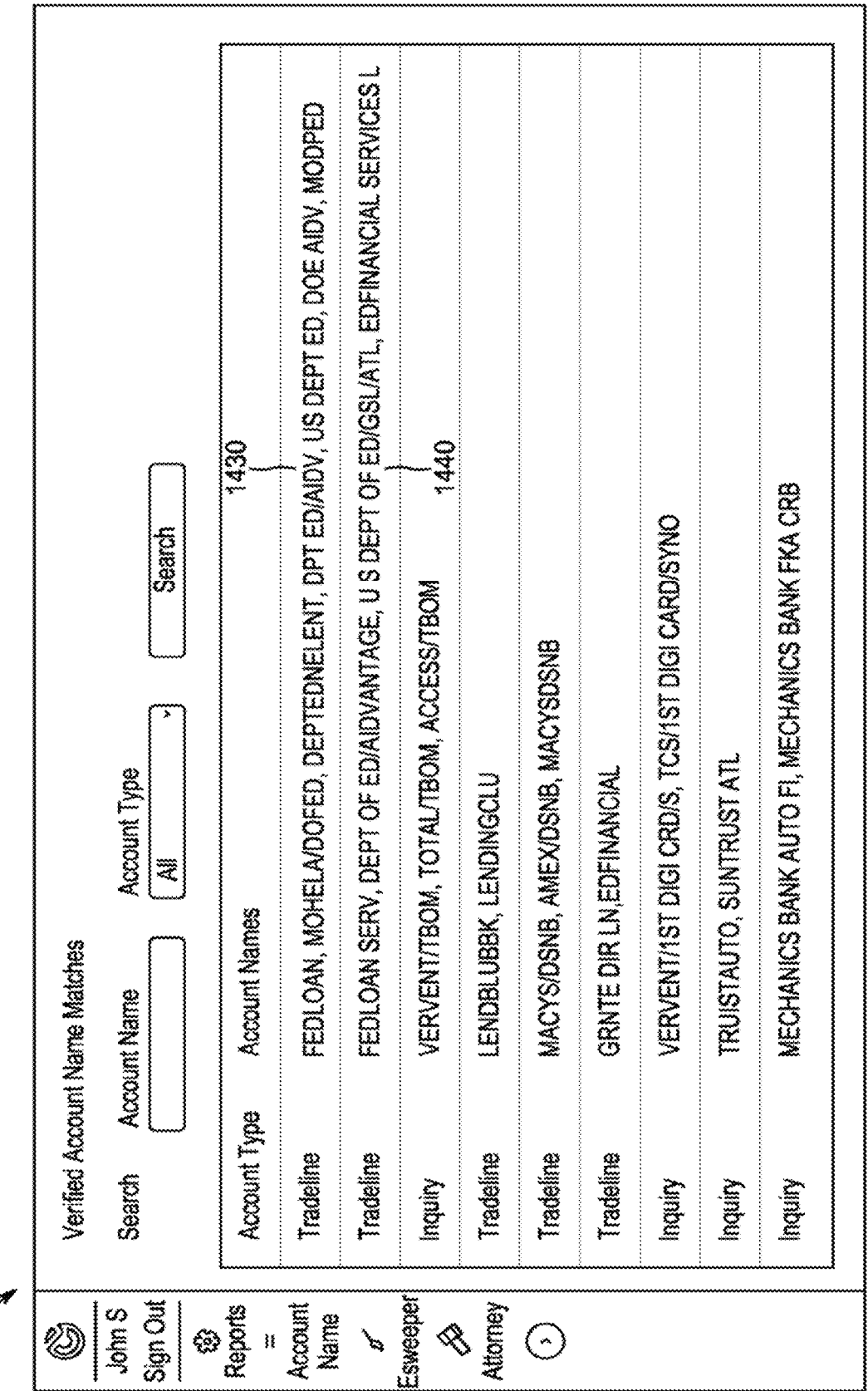
FIG. 14 is an example portion of a system administrator's screen illustrating mismatches in creditor account names, according to one aspect of the present invention.

There can be more than one creditor account with an identical name. Turning now to FIG. 14, is an example portion 1400 of a system administrator's screen illustrating mismatches in creditor account names, according to one aspect of the present invention.

For example, as shown in FIG. 12, there are two AMEX creditor accounts 1212, 1214, to illustrate this aspect. On the left side 1210, selecting one of the accounts, 1216 will automatically highlight the corresponding account 1218 on the right side 1230.

During the creditor account matching process, the system is able to track changes in account names. These changes again may be due to rebranding, merger, acquisition, or changes in formats from credit monitoring services or credit reporting agencies. In the event a current creditor account is matched by other criteria with high confidence other than the account name, the system automatically appends to a list of equivalent account names to aid in future matching. For example, "CAPITAL ONE" may now be "CAPONE" for future matching purposes. FIG. 14 entry 1430 shows "FED-LAN MOHLEA" is the same name as "DOFED, DEPTED-NELNET,DPT ED" which is the same name as "AIDV, US DEPT ED." Also, entry 1440, "MACYS" is the same as "DSNB, AMEX", which is the same as "DSNB, MACYSDSNB".

Figure 15:
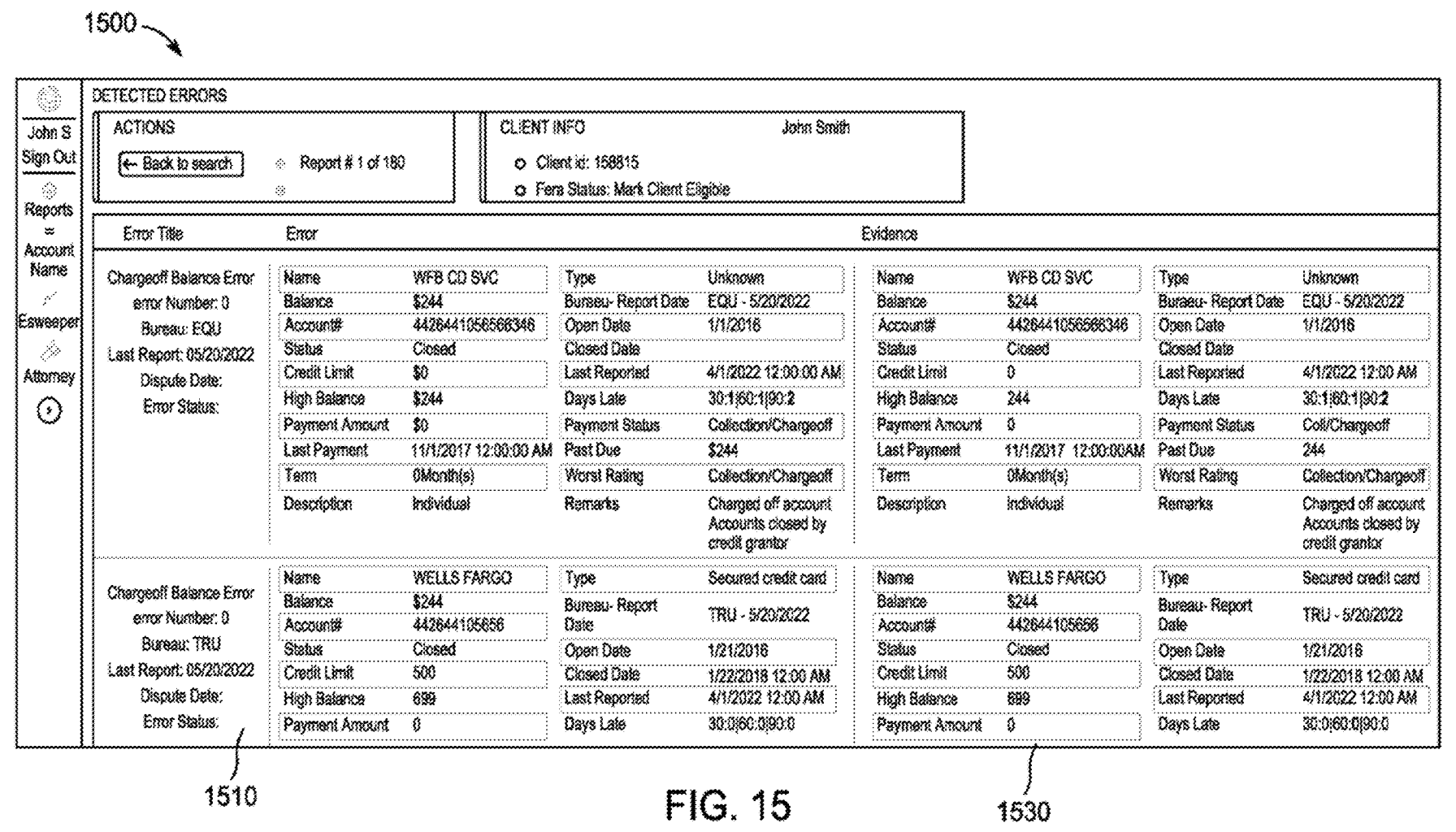

Turning now to FIG. 15 is an example portion 1500 of a system administrator's screen illustrating a first type of credit reporting error automatically detected by the system, according to one aspect of the present invention. Shown on the left panel 1510 is the source of the error and the right side the evidence 1530 that supports this error. In this example it is a "Chargeoff Balancer Error" that the system automatically identified. It is an error because it shows an amount of $244 past due while saying that the account was "charged off" and "account closed by credit grantor." An account cannot have an amount past due if it is "charged off". Stated differently, as detailed in section below entitled "List of Credit Reporting Errors"—As shown in the left side 1510 When an account has a greater than zero-dollar balance but there is a payment status of "Charged-Off" or other indications that the debt was written off as a loss and therefore should have a zero-dollar balance. This evidence on the right side 1530 will always be the same account & bureau & report date as the Error Account. In one example, the error, which is negative information that may adversely affect a customer's credit report, is shown in a font color such as red or highlighted to make it stand out.

This is a mismatch with the evidence shown on the right-side panel. The system will provide the user the automatically generated letter to dispute this incorrect information with text tailors to this "Chargeoff Balancer Error." It is important to note that the error can occur within the creditor account from one crediting reporting agency or across creditor accounts and/or across credit reporting agencies.

Turning to FIG. 16 is an example portion of a system administrator's screen illustrating a second type of a credit reporting error automatically detected by the system, according to one aspect of the present invention. This example illustrates a "Late Payment Error." The current credit report from Experian on the left side 1610 illustrates the evidence of the error. Specially, 31 Late Payments (26+5) 1612. However, the credit reporting data shown on the right-side 1630 reports late payment of 27 Late Payments (24+4) 1632. This is a mismatch with the evidence shown on the right-side panel 1632. Stated differently, as detailed in the section below entitled "List of Credit Reporting Errors"—When there is an account reporting late payments, but the same account on another bureau is reporting a lesser amount of late payments as shown on the left side 1610. The right side 1630 is the Evidence Account will always be the same account on a different bureau as the Error Account.

The system will provide the user the an automatically generated letter to dispute this incorrect information with text tailors to this "Late Payment Error." Reporting 31 late payments compared with 27 late payments is an identified error that will negatively affect the user's credit report.

As discussed above for FIG. 15, the error, which is negative information that may adversely affect a customer's credit report, is shown in a font color such as red or highlighted to make it stand out. Turning to FIG. 17, notice that there is a difference on the left-side 1710 between the late payment date of Apr. 1, 2022 1712 and the right side 1730 payment date of Apr. 27, 2022 1732. In one embodiment, the system does not highlight errors or positive items that do not negatively affect the customer's credit rating. Other examples of differences that are not emphasized or highlighted are account numbers because the change, gets truncated, overtime and these changes do not negatively affect the customers' credit rating.

Figure 18:
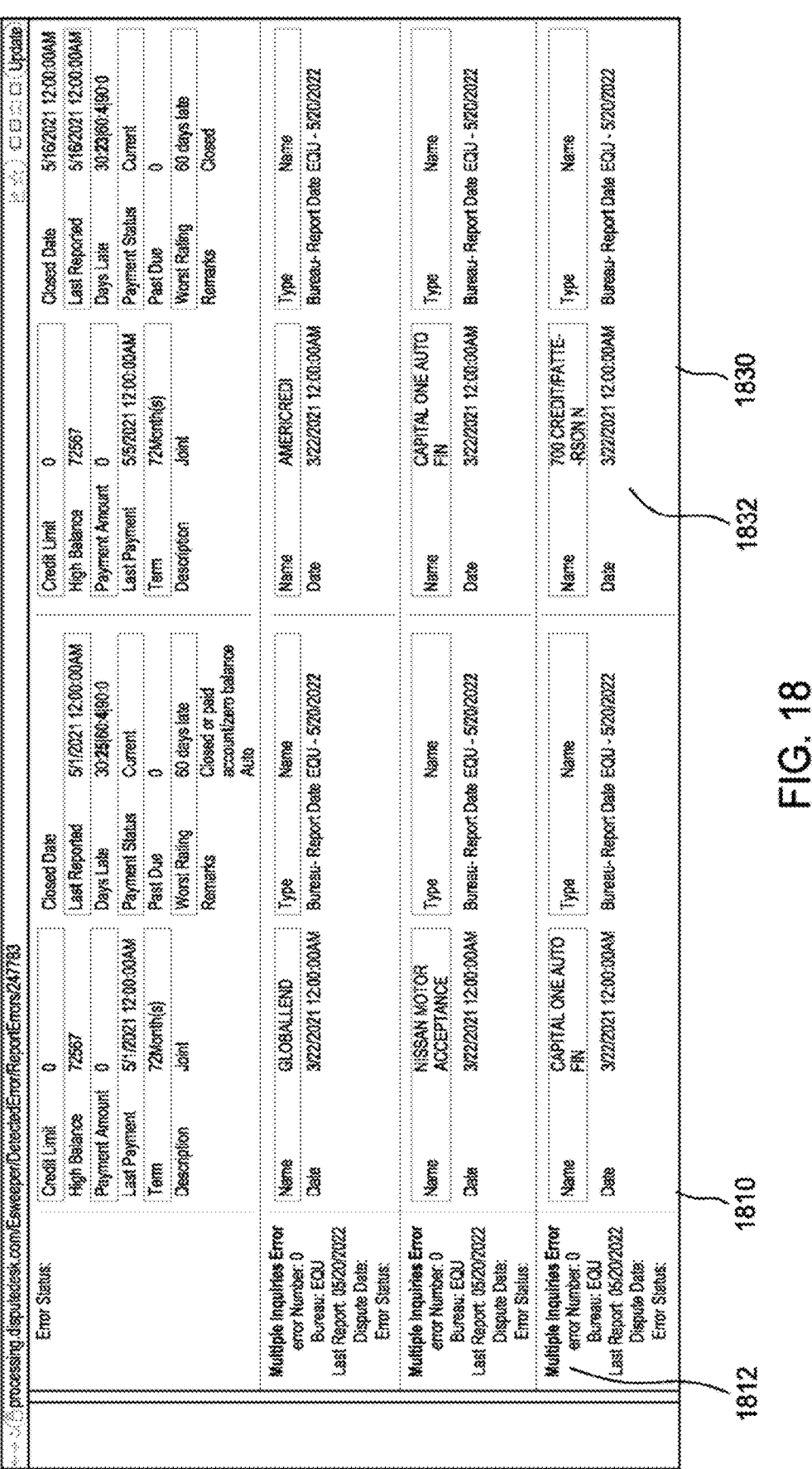
FIG. 18 is an example portion of a system administrator's screen illustrating yet a fourth type of a credit reporting error automatically detected by the system, according to one aspect of the present invention.

FIG. 18 is an example portion 1800 of a system administrator's screen illustrating a fourth type of a credit reporting error automatically detected by the system but is ignored since it does not affect the credit rating of the user, according to one aspect of the present invention. This example illustrates a "Multiple Inquires." as detailed in section below entitled "List of Credit Reporting Errors"—When there is an inquiry reporting and there is another inquiry with the same date as well as shown on the left side 1810. The evidence on show on the right-side 1830, will always be a different account on the same bureau as the left-side 1812 i.e., the Error Account. This is a mismatch with the evidence shown on the right-side panel 1832. The system will provide the user the automatically generated letter to dispute this incorrect information with text tailors to this "Multiple Inquires."

More Credit Reporting Examples

FIG. 19 through FIG. 22 illustrates select examples of credit reporting errors from the section below entitled "List of Credit Reporting Errors", according to one aspect of the present invention.

The first example category of errors 1910 are errors derived by identifying inherent contradictions contained within the account details of a single account on a single bureau. For example, as shown in FIG. 19, a client's Transunion report from May 1, 2020 has an account that is listed as "Closed" and "Charged off" with a past due amount of $50 and a balance of $300. As the account is listed as both "Closed" and "Charged Off", the past due amount and the balance amount should be equal.

The second example category of errors 2010 are errors derived by identifying contradictions or duplicating reporting of a debt by comparing the account details of multiple or all accounts on a single bureau. For example, as shown in FIG. 20, a client's Transunion report from May 1, 2020 indicates there is an account being furnished by a credit union (i.e., Nevada Credit Union) reporting an $800 balance owed. On that same report, there is a collection account being furnished by a debt collector (i.e., Collection Agency Vegas) for that same debt, and it is also reporting a balance owed. The balances for both accounts are $800, and it is evident that the balance on the collection account relates to the same debt being reported with a balance due by the original creditor (Nevada Credit Union).

The third example category of errors 2110 are those errors derived by identifying discrepancies in account details across at least two different credit bureaus and, optionally, all credit reporting agencies from which data has been uploaded. For example, as shown in FIG. 21, a client's Transunion report from May 1, 2020 has an account (i.e., Hyundai) that is being reported as "Closed" with a $0 balance but on the client's EQU report from May 1, 2020 that same account is being reported as "Open" and/or with a $437 balance. One of these entries is obviously incorrect, therefore, an error is identified.

The fourth example category of errors 2210 is those errors derived by identifying discrepancies between past and current credit reports regarding certain account details and account types. For example, as shown in FIG. 22, on a client's Transunion report from Feb. 1, 2020, there was a collection account with an open date of Oct. 1, 2015. But, on the client's Transunion report from May 1, 2020, that same collection account now has an open date of Apr. 1, 2020.

When an error is identified, the process generates custom dispute language for each error and presents the errors and dispute language to the user via a user interface. The user has the option to accept, edit or discard the error and its dispute language. The disclosure contemplates that the identified errors can be presented to the user prior to generating the custom dispute language so that if the user wishes to omit a particular identified error (for example, if the error has already been resolved), no custom dispute language is generated for that omitted error. If the user desires, a dispute letter is automatically generated from the custom dispute language and sent to the proper credit reporting agency so that the error may be corrected. The process provides the user with appropriate guidance on how to send the dispute letter based on the requirements from the proper credit reporting agency (e.g. certified mail, email to a specific email address, online form, etc.).

List of Credit Reporting Errors

The following is a list of errors automatically detected by the present invention. It is important to note that this list is non-exhaustive and that additional types of credit reporting errors may be added or in contrast some errors that don't positively affect a user's credit score removed due to for example future changes in consumer protection laws.

1. Authorized User Error
   a. There is an account being reported with negative information such as missed payments but the account holder is an authorized user and is not responsible for the missed payments.
   b. The Evidence Account will always be the same account & bureau & report date as the Error Account.
2. Balance Due Error (Collection)
   a. When an account has a greater than zero-dollar balance but the same account on another bureau is being reported with a zero-dollar balance.
   b. The Evidence Account will always be the same account as the Error Account but on a different bureau.
3. Balance Due Error (Tradeline)
   a. When an account has a greater than zero-dollar balance but the same account on another bureau is being reported without a balance and a status of closed.
   b. The Evidence Account will always be the same account as the Error Account but on a different bureau.
4. Bankruptcy Error (Collection)
   a. When an account has a greater than zero-dollar balance with an open date prior to a discharged chapter 7 bankruptcy that should have been cleared due to a chapter 7 bankruptcy.
   b. The Evidence Account will always be the bankruptcy and must be on the same bureau as the Error Account.

16

5. Bankruptcy Error (Tradeline)
   a. When an account has a greater than zero-dollar balance with an open date prior to a discharged chapter 7 bankruptcy that should have been cleared due to a chapter 7 bankruptcy (excludes student/government loans as well as other types of debt that are not typically discharged in bankruptcy).
   b. The Evidence Account will always be the bankruptcy and must be on the same bureau as the Error Account.
6. Chargeoff Balance Error
   a. When an account has a greater than zero-dollar balance but there is a payment status of "Charged-Off" or other indications that the debt was written off as a loss and therefore should have a zero-dollar balance.
   b. The Evidence Account will always be the same account & bureau & report date as the Error Account.
7. Deleted on Other Bureaus (Collection)
   a. When there is an account that was disputed on a specific bureau but not deleted and the same account was disputed and subsequently deleted on a different bureau.
   b. The Evidence Account will always be the same account on a different bureau as the Error Account.
8. Deleted on Other Bureaus (Public Record)
   a. When there is a public record that was disputed on a specific bureau but not deleted and the same record was disputed and subsequently deleted on a different bureau.
   b. The Evidence Account will always be the same account on a different bureau as the Error Account.
9. Deleted on Other Bureaus (Tradeline)
   a. When there is an account that was disputed on a specific bureau but not deleted and the same account was disputed and subsequently deleted on a different bureau.
   b. The Evidence Account will always be the same account on a different bureau as the Error Account.
10. Discharge Status Error
    a. When an account has a greater than zero-dollar balance with an open date prior to a discharged chapter 7 bankruptcy that should have been cleared due to a chapter 7 bankruptcy.
    b. The Evidence Account will always be the corresponding tradeline or collection and will always be on the same bureau as the Error Account which is the bankruptcy record.
11. Duplicate Collector Error (Different Collectors)
    a. When there are two different collection agencies reporting the same debt (determined by a combination of balance amount, high balance amount, original creditor, debt collector names, open date and account number).
    b. The Evidence account will always be a different account on the same bureau as the Error Account.
12. Duplicate Creditor Error
    a. When one creditor is reporting the same debt twice (determined by a combination of balance amount, high balance amount, creditor name, open date, responsibility, account type and account number).
    b. The Evidence Account will always be a different account on the same bureau as the Error Account.
13. Duplicate Record Error
    a. When a public record is being reported twice.
    b. The Evidence Account will always be a different account on the same bureau as the Error Account.

14. Late Payment Error
  a. When there is an account reporting late payments but the same account on another bureau is reporting a lesser number of late payments.
  b. The Evidence Account will always be the same account on a different bureau as the Error Account.

15. Multiple Inquiries Error
  a. When there is an inquiry reporting and there is another inquiry with the same date as well.
  b. The Evidence Account will always be a different account on the same bureau as the Error Account.

16. Open Date Error (Collection)
  a. When there is an account that has previously had (on any bureau on an earlier report) or currently has (on a different bureau on the current report) an older open date than is currently reporting.
  b. The Evidence Account will always be the same account as the Error Account but can be on any bureau and on any report date.

17. Open Date Error (Tradeline)
  a. When there is an account that has previously had (on any bureau on an earlier report) or currently has (on a different bureau on the current report) an older open date than is currently reporting.
  b. The Evidence Account will always be the same account as the Error Account but can be on any bureau and on any report date.

18. Payment Status Error
  a. When there is an account with a current payment status indicating a past due balance is still owed (such as currently 90 days late) but the account balance is zero.
  b. The Evidence Account will always be the same account & bureau & report date as the Error Account.

19. Resold Collection
  a. When a collection account was disputed and subsequently deleted but now another collection agency has since started reporting the same debt (determined by a combination of balance amount, high balance amount, original creditor, debt collector name, open date and account number).
  b. The Evidence account will always be the deleted collection account that matches the same debt as the Error account.

20. Original Creditor and Collector with Balance (Collection)
  a. When there is a debt that was transferred from the original creditor to a debt collector and both the original creditor and debt collector are reporting a balance due on this account. (Determined by a combination of balance amount, high balance amount, original creditor names, debt collector names, account types, open dates and account numbers).
  b. The Evidence account will always be a tradeline account on the same bureau as the Error Account which is the collection account.

21. Original Creditor and Collector with Balance (Tradeline)
  a. When there is a debt that was transferred from the original creditor to a debt collector and both the original creditor and debt collector are reporting a balance due on this account. (Determined by a combination of balance amount, high balance amount, original creditor names, debt collector names, account types, open dates and account numbers).

b. The Evidence account will always be a collection account on the same bureau as the Error Account which is the tradeline account.

22. Duplicate Collection (Same Collector)
  a. When there is one collection agency reporting the same debt twice (determined by a combination of balance amount, high balance amount, original creditor, debt collector names, account types, open date and account number).
  b. The Evidence account will always be a different account on the same bureau as the Error Account.

More Detailed Generalized Flow

Figure 23:
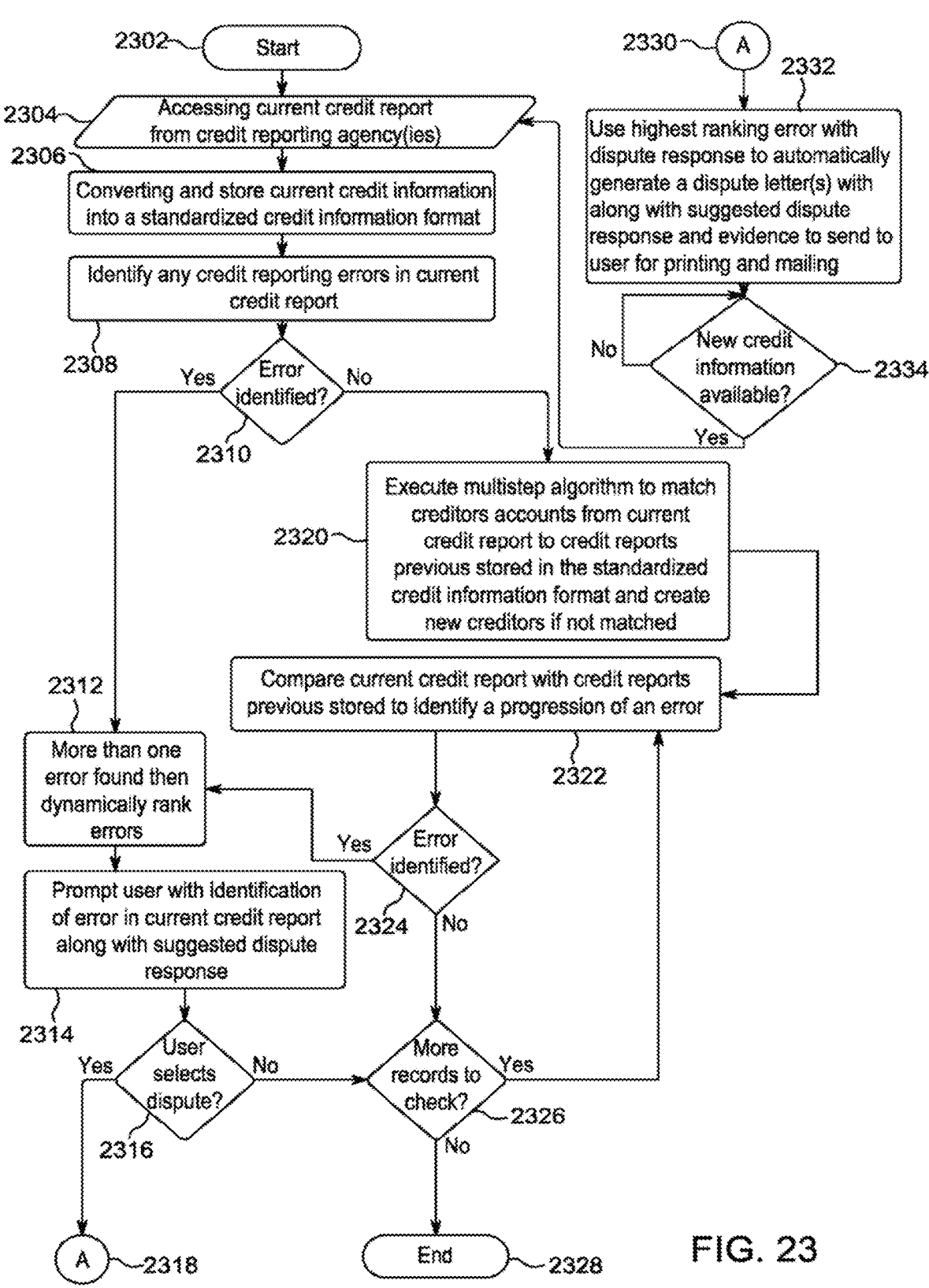
FIG. 23 is a more detailed n operational flow diagram of FIG. 1A and FIG. 1B that illustrates one example procedure for auditing, identifying, and automatically generating dispute letters, according to one aspect of the present invention.

FIG. 23 is a more detailed operational flow diagram of FIG. 1A and FIG. 1B that illustrates one example procedure for auditing, identifying, and automatically generating dispute letters, according to one aspect of the present invention. The process begins in step 2302 and immediately proceeds to step 2304. In step 2304, one or more credit reports for a user are accessed with credit information. These credit reports may be from only one credit reporting agency or all three. The process continues to step 2306.

In step 2306, the current credit report(s) are converted into a standardized credit information format as described above in the section entitled "Standardized Credit Information Format and Account Matching." The process continues to step 2308.

In step 2308, errors in the current creditor's accounts are identified. For example, if two or more credit reporting agencies are providing credit information on the same creditor's account for the same reporting period, these discrepancies are flagged by the system. The process continues to step 2310 to test if the system identified any errors in just the current credit information.

In the case where the system identifies one or more errors, the flow proceeds to step 2312. If more than one error has been identified, the system ranks errors dynamically as previously described in the sections above. The system displays the highest-ranked error to that user for review in step 2314, and the process continues to step 2318.

Step 2318 is a test to determine if the user selects the dispute recommended by the system. If the user selects the suggested dispute, the process continues to step 2318.

Otherwise, in step 2318, if the user does not select the suggested dispute from the system, the process goes to step 2326 to determine if there are more records in the current credit report(s) to review.

Returning to the decision in step 2310, if no errors are identified by the system, the process continues to step 2320. Step 2310 is a multistep algorithm in which the system matches each creditor's account in the current credit report to the "master credit report" which is the previously stored credit information that has been previously stored in the standardized credit information format. If a creditor's account in the current credit account is not matched, the system creates a new account in the master credit report. The process continues to step 2322.

Step 2322, the current credit information is compared against the previously stored credit information to identify a progression of an error or errors. The process continues to step 2324 to test if an error has been detected. In the case in which an error has been detected, the process continues to step 2312 as previously described above. Otherwise, the process proceeds to step 2326 to test if more records in the master credit report are available to be checked. In the case that more creditor account records exist in the master credit report, the process continues to step 2322. Otherwise, if no more creditor's accounts are available to be checked, the process ends in step 2328.

Returning to step 2318, in which an error has been detected, and the user selects the recommended dispute of the system, the process continues to step 2330 as shown and proceeds directly to step 2332.

Step 2332, the errors found with the highest ranking, is used to generate customized dispute letters with suggested language and evidence ready to be sent to the user for printing and mailing to a credit reporting agency. Once the user places the letter in the mail and the credit reporting agencies review the letter, typically, new credit information is available, and the process returns to step 2304.

Generalized Computer/Server System

Turning now to FIG. 24, an example block diagram 2400 of the error auditing and dispute system that can be utilized in embodiments of the present disclosure is provided. The error auditing and dispute system is based upon a suitably configured processing system configured to implement one or more embodiments of the present disclosure. Any suitably configured processing system, including mobile devices running a software application, can be used as the error auditing and dispute system in embodiments of the present disclosure. The components of the error auditing and dispute system can include but are not limited to, one or more processors 2402 or processing units, a system memory 2410, and a bus 2430 that couples various system components, including the system memory to the processor.

The main memory may include an error identifier, a user interface, user credit reports, a dispute generator, and the various error reports. One or more of these components can reside within the processor or be a separate hardware component. The system memory can also include computer system readable media in the form of volatile memory, such as random-access memory (RAM) 2412 and/or cache memory 2414. The error auditing and dispute system can further include other removable/non-removable, volatile/non-volatile computer system storage media. By way of example only, a storage system can be provided for reading from and writing to a non-removable or removable, non-volatile media such as one or more solid state disks and/or magnetic media (typically called a "hard drive") 2416. A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 2430 by one or more data media interfaces 2460. The memory 2410 can include at least one program product having a set of program modules that are configured to carry out the functions of an embodiment of the present disclosure.

Error auditing and dispute programs having a set of program modules may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules 2418 generally carry out the functions and/or methodologies of embodiments of the present disclosure.

The error auditing and dispute system can also communicate with one or more external devices such as a keyboard, a pointing device, a display 2440, etc.; one or more devices that enable a user to interact with the information processing system; and/or any devices (e.g., network card, modem, etc.) that enable computer system/server to communicate with one or more other computing devices. Such communication can occur via I/O interfaces 2450. Still yet, the information processing system can communicate with one or more networks such as a local area network (LAN), a general wide area network (WAN), and/or a public network (e.g., the Internet) 2462 via network adapter 2460 to credit bureaus 2464. As depicted, the network adapter communicates with the other components of information processing system via the bus. Other hardware and/or software components can also be used in conjunction with the information processing system. Examples include, but are not limited to: microcode, device drivers, redundant processing units, external disk drive arrays, RAID systems, tape drives, and data archival storage systems.

Additionally, the error auditing and dispute system may communicate with credit reporting bureaus through the Internet via the network adapter.

Non-Limiting Examples

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be constructed as a critical, required, sacrosanct, or an essential feature of any or all the claims.

After reading the disclosure, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method to improve a credit rating of a user, the method comprising:

using one or more hardware computer processors to electronically accessing, using a computer system with the one or more hardware computer processors, at least one current credit report for a user from one or more credit reporting agencies, and the at least one current credit report including a list of accounts;

converting current credit information from the at least one current credit report from one or more credit reporting agencies into an internal standardized credit information format, which is different from a format from the one or more credit reporting agencies;

matching, for each account name in the list of accounts, a list of equivalent account names, an account opening balance, and an account high balance to denote an existing account or to add a new account;

comparing, each account name in the list of accounts, the at least one current credit report in the internal standardized credit information format to identify a progression of at least one credit reporting error; and in response to identifying the progression of the at least one credit reporting error, automatically notifying the user of the progression of the at least one credit reporting error along with a suggested reason for the at least one credit reporting error to automatically generate a dispute letter referencing the at least one credit report and credit reports in the internal standardized credit information format which has been previously stored, wherein the progression of the at least one credit reporting error is a credit reporting error or contradiction or duplicative error that is i) identified between two or credit reporting agencies, ii) identified in credit reports from one credit reporting agency, or iii) a combination of both.

2. The method of claim 1, further comprising:

storing the current credit information in the internal standardized credit information format as part of a master credit report of historical credit information for the user; and wherein the comparing, each account name in the list of accounts, the at least one current credit report in the internal standardized credit information format includes comparing to credit reports in the internal standardized credit information format, which has been previously stored, to identify a progression of at least one credit reporting error.

3. The method of claim 1, wherein the comparing the at least one current credit report in the standardized credit information format to credit reports in the internal standardized credit information format which has been previously stored, includes limiting the comparing to only one credit reporting agency out of the one or more credit reporting agencies.

4. The method of claim 1, wherein the comparing the at least one current credit report in the standardized credit information format to credit reports in the internal standardized credit information format which has been previously stored, includes comparing across two or more credit reporting agencies.

5. The method of claim 1, further comprising:

identifying any credit reporting errors in the current credit report in the standardized credit information format before comparing credit reports in the internal standardized credit information format which has been previously stored; and in response to identifying the credit reporting errors in the current credit report, notifying the user of the credit reporting errors in the current credit report.

6. The method of claim 1, further comprising:

ranking the progression of the at least one credit reporting error based on a probability of success in improving the credit rating of the user, and wherein the automatically notifying the user of the progression of the at least one credit reporting error includes the ranking of the progression.

7. The method of claim 1, wherein ranking the progression of the at least one credit reporting error based on a probability of success in improving the credit rating of the user including ignoring credit reporting errors that do not improve the credit rating of the user.

8. The method of claim 6, wherein the probability of success is based on responses received from previous letters sent to the one or more credit reporting agencies.

9. The method of claim 6, wherein the automatically notifying the user of the progression of the at least one credit reporting error includes only the at least one credit reporting error the ranking with a highest ranking.

10. The method of claim 1, further comprising:

ranking the progression of the at least one credit reporting error based on a probability of success; and creating a letter, based on the ranking, with language specific to dispute the at least one credit reporting error to send to the one or more credit reporting agencies.

11. The method of claim 1, further comprising:

matching at least one legal service provider to a type of the at least one credit reporting error; and sending an advertisement to the user of the at least one legal service provider that has been matched.

12. The method of claim 11, further comprising:

sending a notification to the user regarding the at least one service provider that has been matched to authorize sharing a user's credit report information with the at least one service provider; and in response to receiving input from the user to authorize sharing, sending to the user's credit report information to the at least one service provider.

13. A method to improve a credit rating of a user, the method comprising:

electronically accessing, using a computer system with one or more hardware computer processors, from at least one current credit report for a user from one or more credit reporting agencies, and the at least one current credit report including a list of accounts;

using the one or more hardware computer processors to:

converting current credit information from the at least one current credit report from one or more credit reporting agencies into an internal standardized credit information format, which is different from a format from the one or more credit reporting agencies;

comparing the list of accounts in the at least one current credit report in the internal standardized credit information format to credit reports in the internal standardized credit information format, to identify a progression of at least one credit reporting error along with a suggested reason for the at least one credit reporting error;

in response to receiving a user selectable button, automatically creating a letter with language specific to dispute the at least one credit reporting error along with the at least one credit report and credit reports in the internal standardized credit information format which has been previously stored to send to the one or more credit reporting agencies, wherein the progression of the at least one credit reporting error is a credit reporting error or contradiction that is i) identified between two or credit reporting agencies, or ii) identified during subsequent rounds of credit reports from the same credit reporting agency, or iii) a combination of both.

14. The method of claim 13, further comprising:

storing the current credit information in the internal standardized credit information format; and wherein the comparing the list of accounts in the at least one current credit report in the internal standardized credit information format to credit reports in the internal standardized credit information format includes comparing to credit reports in the internal standardized credit information format which has been previously stored, to identify a progression of at least one credit reporting error along with a suggested reason for the at least one credit reporting error.

15. The method of claim 13, further comprising:

ranking the progression of the at least one credit reporting error based on a probability of success; and wherein the creating the letter including creating the letter based on the ranking.

16. A computer system to improve a credit rating of a user, comprising:

one or more hardware computer processors executing instructions stored on non-transitory media, the instructions operative to perform:

electronically accessing, using a computer system with the one or more hardware computer processors, at least one current credit report for a user from one or more credit reporting agencies, and the at least one current credit report including a list of accounts;

converting current credit information from the at least one current credit report from one or more credit reporting agencies into an internal standardized credit information format, which is different from a format from the one or more credit reporting agencies;

matching, for each account name in the list of accounts, a list of equivalent account names, an account opening balance, and an account high balance to denote an existing account or to add a new account;

comparing, each account name in the list of accounts, the at least one current credit report in the internal standardized credit information format to identify a progression of at least one credit reporting error; and in response to identifying the progression of the at least one credit reporting error, automatically notifying the user of the progression of the at least one credit reporting error along with a suggested reason for the at least one credit reporting error to automatically generate a dispute letter referencing the at least one credit report and credit reports in the internal standardized credit information format which has been previously stored, wherein the progression of the at least one credit reporting error is a credit reporting error or contradiction or duplicative error that is i) identified between two or credit reporting agencies, ii) identified in credit reports from one credit reporting agency, or iii) a combination of both.

17. The computer system of claim 16, further comprising:

storing the current credit information in the internal standardized credit information format as part of a master credit report of historical credit information for the user; and wherein the comparing, each account name in the list of accounts, the at least one current credit report in the internal standardized credit information format includes comparing to credit reports in the internal standardized credit information format, which has been previously stored, to identify a progression of at least one credit reporting error.

18. The computer system of claim 16, wherein the comparing the at least one current credit report in the internal standardized credit information format to credit reports in the internal standardized credit information format which has been previously stored, includes limiting the comparing to only one credit reporting agency out of the one or more credit reporting agencies.

19. The computer system of claim 16, wherein the comparing the at least one current credit report in the internal standardized credit information format to credit reports in the internal standardized credit information format which has been previously stored, includes comparing across two or more credit reporting agencies.

20. The computer system of claim 16, further comprising:

identifying any credit reporting errors in the current credit report in the standardized credit information format before comparing credit reports in the internal standardized credit information format which has been previously stored; and in response to identifying the credit reporting errors in the current credit report, notifying the user of the credit reporting errors in the current credit report.

\* \* \* \* \*